(12) United States Patent
Bullock et al.

(10) Patent No.: US 12,503,294 B2
(45) Date of Patent: Dec. 23, 2025

(54) CONTAINER AND METHOD OF FORMING A CONTAINER

(71) Applicant: YETI Coolers, LLC, Austin, TX (US)

(72) Inventors: Dustin R. Bullock, Austin, TX (US); Steven M. Scott, Austin, TX (US); Colby Brunet, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 107 days.

(21) Appl. No.: 17/868,471

(22) Filed: Jul. 19, 2022

(65) Prior Publication Data
US 2024/0025621 A1    Jan. 25, 2024

(51) Int. Cl.
| B65D 81/38 | (2006.01) |
|---|---|
| B65D 25/24 | (2006.01) |
| B65D 25/32 | (2006.01) |

(52) U.S. Cl.
CPC ......... B65D 81/3806 (2013.01); B65D 25/24 (2013.01); B65D 25/32 (2013.01); B65D 81/3811 (2013.01)

(58) Field of Classification Search
CPC .... B65D 25/24; B65D 25/32; B65D 81/3806; B65D 81/3811; B65D 81/3823; A47J 41/028
See application file for complete search history.

(56) References Cited

U.S. PATENT DOCUMENTS

| 889,992 | A | 6/1908 | Van Wye |
|---|---|---|---|
| 1,362,713 | A | 12/1920 | Mccoll |
| D58,053 | S | 5/1921 | Wilson |
| D58,501 | S | 7/1921 | Pease |
| 1,391,549 | A | 9/1921 | Larsen |
| D61,009 | S | 5/1922 | Amato |
| 1,497,159 | A | 6/1924 | Porter |
| 1,532,982 | A | 4/1925 | Blom |
| 1,711,536 | A | 5/1929 | Levien |
| D107,795 | S | 1/1938 | Robinson |
| D122,762 | S | 10/1940 | Arnold |
| D151,863 | S | 11/1948 | Ziskin |

(Continued)

FOREIGN PATENT DOCUMENTS

| AU | 91633 S | 3/1986 |
|---|---|---|
| AU | 93717 S | 10/1986 |

(Continued)

OTHER PUBLICATIONS

RTIC Ice Bucket, published date unknown but prior to Jul. 5, 2022, retrieved from https://rticoutdoors.com/Ice-Bucket on Jul. 5, 2022.

(Continued)

Primary Examiner — Andrew T Kirsch
(74) Attorney, Agent, or Firm — Banner & Witcoff, Ltd.

(57) ABSTRACT

An insulating container can be configured to retain a volume of at least 1800 cubic centimeters that includes an outer shell and an inner shell. The outer shell and inner shell may be integrally joined together to form an insulated double wall structure with a sealed vacuum cavity between the two shells. A compressible support member may be placed to between a bottom wall of the outer shell and a bottom wall of the inner shell to help form a planar bottom wall of the inner shell when the vacuum cavity is formed.

19 Claims, 10 Drawing Sheets

(56) References Cited

U.S. PATENT DOCUMENTS

| | | |
|---|---|---|
| D157,637 S | 3/1950 | Shawver |
| D161,298 S | 12/1950 | Ziskin et al. |
| 2,564,165 A | 8/1951 | Adelin |
| D176,091 S | 11/1955 | Ziskin et al. |
| D180,386 S | 6/1957 | Billig et al. |
| D183,082 S | 6/1958 | Billig et al. |
| D183,975 S | 11/1958 | Painter et al. |
| D184,461 S | 2/1959 | Sherman et al. |
| D195,867 S | 8/1963 | Miller et al. |
| D197,982 S | 4/1964 | Stayman |
| D207,452 S | 4/1967 | Stayman |
| D225,668 S | 12/1972 | Darr |
| 3,750,819 A | 8/1973 | Wilson |
| 3,782,583 A | 1/1974 | Abbey |
| D233,206 S | 10/1974 | Kaufman |
| 3,844,450 A | 10/1974 | Johnson |
| 3,977,552 A | 8/1976 | Lombardo |
| 3,998,072 A | 12/1976 | Shaw |
| D244,823 S | 6/1977 | Lass |
| 4,037,428 A | 7/1977 | Giannotti |
| 4,138,027 A | 2/1979 | Frye et al. |
| 4,232,532 A | 11/1980 | Marsh |
| 4,255,944 A | 3/1981 | Gardner et al. |
| D259,614 S | 6/1981 | Angelakos |
| D260,130 S | 8/1981 | Perrin |
| 4,323,620 A * | 4/1982 | Iwabuchi .................. B32B 7/02 428/432 |
| 4,341,316 A | 7/1982 | Bunge |
| D265,789 S | 8/1982 | Trombly |
| 4,344,303 A | 8/1982 | Kelly, Jr. |
| 4,347,713 A | 9/1982 | Morrison et al. |
| 4,383,422 A | 5/1983 | Gordon et al. |
| 4,394,929 A * | 7/1983 | Patel ..................... F17C 13/005 285/332 |
| 4,399,919 A | 8/1983 | Posnansky et al. |
| D272,795 S | 2/1984 | Pozzi |
| D285,765 S | 9/1986 | Zieff |
| D285,766 S | 9/1986 | Zieff |
| D285,767 S | 9/1986 | Zieff |
| D294,445 S | 3/1988 | Jorgensen |
| D300,294 S | 3/1989 | Pozzi |
| 4,809,522 A | 3/1989 | deNevers et al. |
| D300,495 S | 4/1989 | Minuti |
| 4,823,974 A | 4/1989 | Crosser |
| D301,007 S | 5/1989 | Laski |
| D301,958 S | 7/1989 | Zivin |
| 4,870,837 A | 10/1989 | Weins |
| D305,967 S | 2/1990 | Durand |
| D310,155 S | 8/1990 | deNevers et al. |
| D315,476 S | 3/1991 | Sun |
| D341,780 S | 11/1993 | Turner |
| 5,273,182 A | 12/1993 | Laybourne |
| D350,047 S | 8/1994 | Kiyokane |
| D352,143 S | 11/1994 | Arshinoff |
| D373,513 S | 9/1996 | Joergensen |
| 5,564,583 A | 10/1996 | Kelley et al. |
| 5,634,256 A | 6/1997 | Fritschi |
| 5,657,871 A * | 8/1997 | Waters .................. B65D 7/045 220/636 |
| D398,663 S | 9/1998 | Freelander |
| D407,606 S | 4/1999 | Carrere |
| D407,608 S | 4/1999 | Carrere |
| D417,593 S | 12/1999 | Ruegg |
| 6,053,317 A | 4/2000 | Morris et al. |
| D431,754 S | 10/2000 | Thuma |
| 6,196,017 B1 | 3/2001 | Chapman |
| 6,244,458 B1 | 6/2001 | Frysinger et al. |
| 6,257,440 B1 | 7/2001 | Perkins et al. |
| 6,308,846 B1 | 10/2001 | Muller |
| D453,449 S | 2/2002 | Williams |
| 6,357,253 B1 | 3/2002 | Condy |
| 6,474,498 B1 | 11/2002 | Markham |
| 6,505,752 B1 | 1/2003 | Rolfes et al. |
| D470,724 S | 2/2003 | Basara |
| D470,725 S | 2/2003 | Basara |
| D483,620 S | 12/2003 | Basara |
| D488,354 S | 4/2004 | Irvine |
| D488,355 S | 4/2004 | Irvine |
| D488,356 S | 4/2004 | Wiest |
| D497,777 S | 11/2004 | Sanders et al. |
| D506,644 S | 6/2005 | Poupel et al. |
| D530,157 S | 10/2006 | Bodum |
| D559,629 S | 1/2008 | Gifford, Jr. |
| D560,100 S | 1/2008 | Wang |
| D560,101 S | 1/2008 | Wang |
| D560,977 S | 2/2008 | Lown et al. |
| 7,328,876 B2 | 2/2008 | Jones |
| D584,109 S | 1/2009 | Krog |
| D601,861 S | 10/2009 | Richardson |
| D608,156 S | 1/2010 | Bodum |
| D609,977 S | 2/2010 | Gjonaj |
| D621,223 S | 8/2010 | Bas |
| D622,089 S | 8/2010 | Daniel et al. |
| 7,784,759 B2 | 8/2010 | Farrell |
| D625,963 S | 10/2010 | Palella |
| D651,049 S | 12/2011 | Nakagawa |
| D653,504 S | 2/2012 | Jensen |
| D660,654 S | 5/2012 | Radinsky |
| D673,749 S | 1/2013 | Heiser, Jr. et al. |
| D683,510 S | 5/2013 | Schick |
| D683,920 S | 6/2013 | Bonafide |
| 8,613,417 B2 | 12/2013 | Kraus, Jr. |
| 8,646,740 B1 | 2/2014 | Nelson et al. |
| D700,749 S | 3/2014 | Gifford |
| 8,757,418 B2 | 6/2014 | Zimmerman et al. |
| D715,844 S | 10/2014 | Cooper |
| D722,474 S | 2/2015 | Seiders |
| D722,833 S | 2/2015 | Miller |
| D727,688 S | 4/2015 | Hewitt et al. |
| D730,126 S | 5/2015 | Wall |
| 9,022,252 B2 | 5/2015 | Beggins et al. |
| D739,682 S | 9/2015 | Peterson et al. |
| 9,186,005 B1 | 11/2015 | Ferrier, Jr. |
| 9,310,117 B2 | 4/2016 | Schlessinger et al. |
| 9,380,900 B2 | 7/2016 | Tehensky |
| 9,505,527 B1 | 11/2016 | Campbell |
| D788,467 S | 6/2017 | Ma |
| 9,750,359 B2 | 9/2017 | Kah, Jr. |
| 9,775,455 B2 | 10/2017 | Weissbart et al. |
| D801,753 S | 11/2017 | Piper et al. |
| D807,712 S | 1/2018 | Miller et al. |
| D808,733 S | 1/2018 | Spivey et al. |
| D812,981 S | 3/2018 | Cooper |
| D815,786 S | 4/2018 | Seiders et al. |
| D815,787 S | 4/2018 | Seiders et al. |
| D816,422 S | 5/2018 | Nguyen |
| 9,988,202 B2 | 6/2018 | Haas |
| 10,010,203 B1 | 7/2018 | Vaughn |
| 10,034,580 B2 | 7/2018 | Seiders et al. |
| 10,059,488 B2 | 8/2018 | Chiriga |
| D829,512 S | 10/2018 | Masanek, Jr. et al. |
| 10,085,597 B2 | 10/2018 | Bodum |
| 10,086,976 B2 | 10/2018 | Tuan |
| D835,945 S | 12/2018 | Verellen |
| D839,679 S | 2/2019 | Yuki et al. |
| D841,403 S | 2/2019 | Cooper et al. |
| D843,178 S | 3/2019 | Furneaux et al. |
| D848,224 S | 5/2019 | DeBoer |
| 10,368,672 B2 | 8/2019 | Masanek, Jr. et al. |
| 10,368,673 B2 | 8/2019 | Loeb et al. |
| 10,390,659 B2 | 8/2019 | Tolman et al. |
| D864,642 S | 10/2019 | Hotchkiss et al. |
| 10,427,858 B2 | 10/2019 | Mackintosh et al. |
| D869,241 S | 12/2019 | Ellison et al. |
| D871,159 S | 12/2019 | Ellison et al. |
| D876,904 S | 3/2020 | Schneider |
| D877,618 S | 3/2020 | Baker |
| D878,163 S | 3/2020 | Rane et al. |
| D881,653 S | 4/2020 | Serrahima et al. |
| D883,601 S | 5/2020 | Luburic et al. |
| D889,912 S | 7/2020 | Laukala |
| D891,873 S | 8/2020 | Bums et al. |
| D893,265 S | 8/2020 | Insler |
| 10,729,261 B2 | 8/2020 | Ellison et al. |

(56) References Cited

U.S. PATENT DOCUMENTS

| | | |
|---|---|---|
| D901,988 S | 11/2020 | Jacobsen |
| D902,665 S | 11/2020 | Jacobsen |
| D902,666 S | 11/2020 | Wu |
| D902,667 S | 11/2020 | Wu |
| 10,835,067 B2 | 11/2020 | Rane et al. |
| D908,444 S | 1/2021 | Pape |
| D909,818 S | 2/2021 | Hunter et al. |
| D909,819 S | 2/2021 | Ellison et al. |
| D911,780 S | 3/2021 | Ellison et al. |
| D913,050 S | 3/2021 | Patterson et al. |
| 10,932,476 B2 | 3/2021 | Hill |
| D915,151 S | 4/2021 | Wallin |
| D919,785 S | 5/2021 | Kaye et al. |
| 11,040,819 B1 | 6/2021 | Frankcomb |
| D925,294 S | 7/2021 | Gu |
| D925,994 S | 7/2021 | Wadsworth |
| 11,072,485 B2 | 7/2021 | Spivey et al. |
| D928,566 S | 8/2021 | Manz et al. |
| 11,089,906 B2 | 8/2021 | Haas |
| D930,440 S | 9/2021 | Astle et al. |
| D932,841 S | 10/2021 | Kouza |
| D932,844 S | 10/2021 | Falkenberg |
| D933,427 S | 10/2021 | Ellison et al. |
| D933,428 S | 10/2021 | Ellison et al. |
| D938,231 S | 12/2021 | Martini |
| D947,623 S | 4/2022 | Zhang |
| D949,635 S | 4/2022 | Pisarevsky |
| D951,029 S | 5/2022 | Burns et al. |
| D952,410 S | 5/2022 | Shinichi et al. |
| D957,202 S | 7/2022 | Frankcomb |
| 11,466,921 B2 | 10/2022 | Sonntag et al. |
| 11,484,138 B2 | 11/2022 | Smith et al. |
| D975,504 S | 1/2023 | Mobley et al. |
| D982,391 S | 4/2023 | Luo |
| D985,223 S | 5/2023 | Huang et al. |
| D992,360 S | 7/2023 | Jacob |
| D998,927 S | 9/2023 | Feng |
| D1,050,820 S | 11/2024 | Bullock et al. |
| 2004/0238551 A1 | 12/2004 | Delk |
| 2005/0056759 A1 | 3/2005 | Tiller |
| 2005/0205651 A1 | 9/2005 | Marx |
| 2005/0252234 A1 | 11/2005 | Kim |
| 2008/0135554 A1 | 6/2008 | Hill et al. |
| 2014/0284342 A1 | 9/2014 | Hewitt et al. |
| 2015/0173544 A1 | 6/2015 | Sayarh |
| 2016/0262345 A1 | 9/2016 | Gitter et al. |
| 2017/0153054 A1 | 6/2017 | Sawada et al. |
| 2017/0166385 A1 | 6/2017 | Pisarevsky |
| 2017/0349358 A1 | 12/2017 | Hunter |
| 2019/0014931 A1 | 1/2019 | Khayman |
| 2019/0039810 A1 | 2/2019 | Tolman et al. |
| 2020/0329891 A1 | 10/2020 | Ellison et al. |
| 2021/0221565 A1 | 7/2021 | Lapelosa |
| 2021/0284516 A1 | 9/2021 | Macdonnell |
| 2022/0071420 A1 | 3/2022 | Manning |
| 2022/0098019 A1 | 3/2022 | Bratta |
| 2022/0120487 A1 | 4/2022 | Cao et al. |
| 2022/0135315 A1 | 5/2022 | Hu |
| 2022/0170683 A1 | 6/2022 | Jacob |
| 2023/0025561 A1 | 1/2023 | Snyder |
| 2023/0180951 A1 | 6/2023 | Ellison et al. |
| 2023/0210312 A1 | 7/2023 | Schmieg |

FOREIGN PATENT DOCUMENTS

| | | | |
|---|---|---|---|
| AU | 96834 S | | 6/1987 |
| AU | 1988020697 A1 | | 2/1989 |
| AU | 104193 S | | 6/1989 |
| AU | 108752 S | | 8/1990 |
| AU | 134000 S | | 6/1998 |
| AU | 326924 S | | 7/2009 |
| CA | 56805 | | 8/1986 |
| CA | 57530 S | | 11/1986 |
| CA | 59651 | | 11/1987 |
| CA | 77582 S | | 11/1995 |
| CA | 129554 S | | 9/2009 |
| CA | 141851 S | | 8/2012 |
| CA | 2918262 A1 | | 7/2017 |
| CH | 1404650002 S1 | | 3/2014 |
| CN | 3601792 | | 1/2007 |
| CN | 301133013 | | 2/2010 |
| CN | 301315891 | | 8/2010 |
| CN | 301725897 | | 11/2011 |
| CN | 301732604 | | 11/2011 |
| CN | 302017191 | | 8/2012 |
| CN | 302369687 S | | 3/2013 |
| CN | 302444181 | | 5/2013 |
| CN | 303295008 | | 7/2015 |
| CN | 303504161 | | 12/2015 |
| CN | 102837894 B | | 1/2016 |
| CN | 303734768 S | | 7/2016 |
| CN | 303984507 | | 12/2016 |
| CN | 205866649 U | | 1/2017 |
| CN | 206852522 U | | 1/2018 |
| CN | 206950086 U | | 2/2018 |
| CN | 304655106 | | 6/2018 |
| CN | 304714778 | | 7/2018 |
| CN | 304828491 | | 9/2018 |
| CN | 304860380 | | 10/2018 |
| CN | 304872690 | | 11/2018 |
| CN | 305032210 S | | 2/2019 |
| CN | 305295076 | | 8/2019 |
| CN | 305360127 | | 9/2019 |
| CN | 305457250 S | | 11/2019 |
| CN | 305463485 | | 11/2019 |
| CN | 305469635 | | 12/2019 |
| CN | 305469636 | | 12/2019 |
| CN | 305496612 | | 12/2019 |
| CN | 305523731 S | | 12/2019 |
| CN | 109890256 B | | 2/2020 |
| CN | 305703458 | | 4/2020 |
| CN | 305703860 | | 4/2020 |
| CN | 305731672 | | 4/2020 |
| CN | 305901244 S | | 7/2020 |
| CN | 305954401 | | 7/2020 |
| CN | 305962083 | | 8/2020 |
| CN | 305994456 | | 8/2020 |
| CN | 306044587 | | 9/2020 |
| CN | 306102503 S | | 10/2020 |
| CN | 306214284 | | 12/2020 |
| CN | 306234708 | | 12/2020 |
| CN | 306346393 | | 2/2021 |
| CN | 306357254 | | 3/2021 |
| CN | 306429206 | | 4/2021 |
| CN | 306474758 | | 4/2021 |
| CN | 213110651 U | | 5/2021 |
| CN | 306511015 | | 5/2021 |
| CN | 306608442 | | 6/2021 |
| CN | 307069572 S | | 1/2022 |
| CN | 307177059 S | | 3/2022 |
| DE | 1429955 A1 | | 11/1968 |
| DE | 2328266 A1 | | 1/1975 |
| DE | 8031030 U1 | | 4/1981 |
| DE | 3417061 A1 | | 11/1985 |
| DE | 3612525 A1 | | 10/1987 |
| DE | 29513878 U1 | | 2/1996 |
| DK | MA1999006580001 S | | 2/2000 |
| EP | 0684778 A1 | | 12/1995 |
| EP | 0003909920001 S | | 1/2006 |
| EP | 0004626430001 S | | 2/2006 |
| EP | 0005460640001 S | | 9/2006 |
| EP | 0009179840001 S | | 7/2008 |
| EP | 0012378200001 S | | 10/2010 |
| EP | 0021097510021 S | | 10/2012 |
| EP | 2641840 A1 | | 9/2013 |
| EP | 0030070870002 S | | 5/2016 |
| EP | 0052555850001 S | | 5/2018 |
| EP | 0059310290003 S | | 1/2019 |
| EP | 0063216830008 S | | 6/2019 |
| EP | 006681144-0001 | | 8/2019 |
| EP | 0075083380001 S | | 1/2020 |
| EP | 0075145180001 S | | 1/2020 |
| EP | 3472059 B1 | | 3/2021 |
| ES | 268727 U | | 6/1983 |

(56) References Cited

FOREIGN PATENT DOCUMENTS

| | | |
|---|---|---|
| ES | 1226675 Y | 6/2019 |
| FR | 1057335 A | 3/1954 |
| FR | 2609880 A1 | 7/1988 |
| FR | 20033413011 S1 | 9/2006 |
| GB | 1438025 A | 6/1976 |
| GB | 1495386 A | 12/1977 |
| GB | 2052726 A | 1/1981 |
| GB | 2047771 S | 5/1995 |
| GB | 2075614 S | 6/1998 |
| GB | 4040759 S | 5/2015 |
| GB | 6035527 S | 8/2018 |
| GB | 6063025 | 6/2019 |
| GB | 6063026 | 6/2019 |
| GB | 8205100000-1000 | 12/2019 |
| GB | 8205100000-2000 | 12/2019 |
| GB | 8205100000-3000 | 12/2019 |
| GB | 6156837 | 8/2021 |
| GB | 6157850 | 8/2021 |
| HK | 22194620004 S | 6/2022 |
| ID | D0000002094-0001 | 12/2002 |
| ID | D0000002785-0001 | 2/2003 |
| IN | 2249530001 S | 1/2011 |
| IN | 280543-0001 | 7/2016 |
| IN | 316505-001-0001 | 12/2019 |
| JP | 1973032373 U | 4/1973 |
| JP | 1984015074 A | 1/1984 |
| JP | 1985075263 U | 5/1985 |
| JP | 1986129769 U | 8/1986 |
| JP | 3039324 U | 7/1997 |
| JP | 1999049252 A | 2/1999 |
| JP | 2001330357 A | 11/2001 |
| JP | D1143292 | 6/2002 |
| JP | 1438915 S | 4/2012 |
| JP | 1458845 S | 1/2013 |
| JP | D1458701 | 1/2013 |
| JP | D1458702 | 1/2013 |
| JP | 5423552 B2 | 2/2014 |
| JP | 2015144696 A | 8/2015 |
| JP | D1640181 | 9/2019 |
| JP | 1675586 S | 1/2021 |
| JP | D1746281 | 6/2023 |
| KR | 300952415 S | 4/2018 |
| KR | 101935856 B1 | 1/2019 |
| KR | 102039098 B1 | 10/2019 |
| KR | 301126194 S | 9/2021 |
| SI | 2002500650001 S | 8/2002 |
| TW | M280360 U | 11/2005 |
| WO | 2004013552 A1 | 2/2004 |
| WO | D065375-013 | 6/2004 |
| WO | 2008078860 A1 | 7/2008 |
| WO | D071187-001 | 6/2009 |
| WO | D078276-007 | 5/2012 |
| WO | 2018147843 A1 | 8/2018 |
| WO | D205100-001 | 6/2020 |
| WO | 2022040745 A1 | 3/2022 |
| WO | 2022072767 A2 | 4/2022 |

OTHER PUBLICATIONS

Coleman 2 Gallon Stacker Beverage Cooler, published date unknown but prior to Jul. 5, 2022, retrieved from https://www.amazon.com/Coleman-Gallon-Stacker-Beverage-Cooler/dp/B00363PRGA/ on Jul. 5, 2022.

OXO Ice Bucket and Tongs Set—Brushed Stainless Steel, published May 3, 2012, retrieved from https://www.amazon.com/OXO-SteeL-Ice-Bucket-Tongs/dp/B007MHJ06E/ on Jul. 5, 2022.

King International Stainless Steel Bar Set, published date unknown but prior to Jul. 5, 2022, retrieved from https://www.amazon.com/King-International-Stainless-Accessories-Cocktail/dp/B07B2WWK5X/ on Jul. 5, 2022.

Bartenders Choice Fun Colors Lemon 3 Qt Ice Bucket, published date unknown but prior to Jul. 5, 2022, retrieved from https://www.homedepot.com/pep/Kraftware-Bartenders-Choice-Fun-Colors-Lemon-3-Qt-Ice-Bucket-13966/203087117 on Jul. 5, 2022.

Yeti Boomer 4 Dog Bowl, retrieved on Jun. 2, 2022, https://www.yeti.com/dogs/dog-bowls/21071501086.html, 8 pgs.

"Ipujan Wine Chiller Bucket with Stainless Ice Stone—Champagne Bucket for 750ml Single Bottle Cold up to 5 Hours—Iceless Insulated Double Walled White Wine Cooler Bucket"; amazon.com; retrieved Apr. 19, 2023; published Aug. 18, 2022; URL: <https://www.amazon.com/IPUJAN-Chiller-Bucket-Stainless-Stone/dp/BOB9ZXCQ41>.

"Wine Bottle Chiller, Wine Chiller Bucket with Ice Pack for 750ml White Wine Bottle or Champagne, Stainless Steel Wine Cooler Bucket, Champagne Bucket Perfect Wine Accessories for Wine Lovers"; amazon.com; retrieved Apr. 19, 2023; published Feb. 28, 2021; URL: <https://www.amazon.com/dp/B08JK95877>.

"Acopa 4 3/4" x 8" Double-Walled Stainless Steel Wine Cooler"; webstaurantstore.com; retrieved Apr. 19, 2023; published date unknown, prior to the filing date of the present Application; URL: <https://www.webstaurantstore.com/acopa-4-3-4-x-8-double-walled-stainless-steel-wine-cooler/176CWDWSS8.html?utm_source=google&utm_medium=cpc&utm_campaign=GoogleShopping&gclid=EAlalQobChMI5viSxonJgQMVj0hHAR1zxQBaEAQYASABEgIBZ_D_BwE>.

"Barware Stainless Steel Wine Chiller by Oggi"; wayfair.com; retrieved Apr. 19, 2023; published date unknown, prior to the filing date of the present Application; URL: <https://www.wayfair.com/kitchen-tabletop/pdp/oggi-barware-stainless-steel-wine-chiller-ogib1052.html?piid=>.

"Easy Stainless Steel Wine Bucket by Blomus"; wayfair.com; retrieved Apr. 19, 2023; published date unknown, prior to the filing date of the present Application; URL: <https://www.wayfair.com/kitchen-tabletop/pdp/blomus-easy-bottle-cooler-ry1384.html?piid=68123328>.

"Stainless Steel Ice Bucket by Velaze"; wayfair.com; retrieved Apr. 19, 2023; published date unknown, prior to the filing date of the present Application; URL: <https://www.wayfair.com/kitchen-tabletop/pdp/velaze-double-walled-bar-ice-bucket-claz1021.html>.

"Sommelier Stainless Steel Wine Bucket by Zwilling J.A. Henckels"; wayfair.com; retrieved Apr. 19, 2023; published date unknown, prior to the filing date of the present Application; URL: <https://www.wayfair.com/kitchen-tabletop/pdp/zwilling-ja-henckels-sommelier-wine-chiller-jah2492.html>.

"American Metalcraft WCFS462 Silver Acrylic Wine Cooler"; webstaurantstore.com; retrieved Apr. 19, 2023; published date unknown, prior to the filing date of the present Application; URL: <https://www.webstaurantstore.com/american-metalcraft-wcfs462-silver-acrylic-wine-cooler/124WCFS462.html>.

""Ocean" wine cooler, mud by GioBagnara"; artedona.com; retrieved Apr. 19, 2023; published date unknown, prior to the filing date of the present Application; URL: <https://www.artedona.com/en/Bar-Wine/Wine-accessories/GioBagnara-Ocean-wine-cooler-mud.html>.

"Chelsea Wine Chiller by Godinger Silver Art Co"; wayfair.com; retrieved Apr. 19, 2023; published date unknown, prior to the filing date of the present Application; URL: <https://www.wayfair.com/kitchen-tabletop/pdp/godinger-silver-art-co-chelsea-wine-chiller-rxk10535.html>.

"Dirk Stainless Steel Wine Bucket by Orren Ellis"; wayfair.com; retrieved Apr. 19, 2023; published date unknown, prior to the filing date of the present Application; URL: <https://www.wayfair.com/kitchen-tabletop/pdp/orren-ellis-dirk-double-wall-wine-chiller-w003029074.html>.

"Wanyng Glass&Bottle Stainless Steel Insulated Slim Can Cooler for 12Oz Double-walled Vacuum Stainless Steel Can Cooler Holder cold water cup Grey"; walmart.com; retrieved Apr. 19, 2023; published date unknown, prior to the filing date of the present Application; URL: <https://www.walmart.com/ip/WANYNG-Glass-Bottle-Stainless-Steel-Insulated-Slim-Can-Cooler-For-12Oz-Double-walled-Vacuum-Stainless-Steel-Can-Cooler-Holder-cold-water-cup-Grey/1581513664>.

"3D Printed Honey Comb Style Drink Coaster / Set of 4 with Free Holder / Custom Color Options"; etsy.com; retrieved Apr. 19, 2023; published date unknown, prior to the filing date of the present Application; URL: <https://www.etsy.com/listing/860750655/3d-

(56) References Cited

OTHER PUBLICATIONS printed-honey-comb-style-drink?gpla=1&gao=1&utm_source=google&utm_medium=cpc&utm_campaign=shopping_us_c-home_and_living-kitchen_and_dining-drink_and_barware-drinkware-.
"Honeycomb Coaster Molds Honeycomb Pattern Coaster Silicone Mold for Casting Epoxy Resin Round SiliconeCoaster Mold for Resin, DIY Cold/Hot Beverage Cup Mats"; walmart.com; retrieved Apr. 19, 2023; published date unkown, prior to the filing date of the present Application; URL: <https://www.walmart.com/ip/Honeycomb-Coaster-Molds-Pattern-Silicone-Mold-Casting-Epoxy-Resin-Round-Resin-DIY-Cold-Hot-Beverage-Cup-Mats/1238544858?wmlspartner=wlpa&selectedSellerId=16214https://www.walmart.com/ip/Honeycomb-Coaster-Molds-Pattern-Silicone-.
"Cook's Fancy Double Walled Wine Chiller—Brushed Stainless Steel Finish—Insulated Wine Cooler/Champagne Bucket—Fits All 750ml Bottles—Keeps Bottles Cold (Single Pack)"; amazon.com; retrieved Apr. 19, 2023; published May 30, 2019; URL: <https://www.amazon.com/dp/B07SJ833B2>.
"Premium Iceless Wine Chiller Bucket—Champagne Bucket—Insulated Double Walled to Keep 750ml White Wine Bottles Colder for Longer Wine Bottle Cooler bucket Champagne Chiller (Stainless Steel)"; amazon.com; retrieved Apr. 19, 2023; published May 5, 2019; URL: <https://www.amazon.com/dp/B07RL6F3TW>.
"Jolitac 4 Pack Wine Chiller Bucket, Stainless Steel Double Wall Wine Cooler Bucket, Keeps Cold for Hours Wine Bottle Cooler Chiller Insulated Champagne Beer Ice Bucket (4 PCS)"; amazon.com; retrieved Apr. 19, 2023; published Apr. 25, 2019; URL: <https://www.amazon.com/dp/B07R454HM3>.
"Cheer Moda Wine Chiller—Premium Iceless Wine Cooler, Keeps All 750ml Bottles Cold for Hours, Elegant Insulated Champagne Bucket & Wine Bottle Cooler Ice Bucket, Blue"; amazon.com; retrieved Apr. 19, 2023; published Mar. 1, 2021; URL: <https://www.amazon.com/CHEER-MODA-Stainless-Champagne-Tabletop/dp/B08XQ9SL4Z>.
Oct. 3, 20231—(WO) International Search Report & Written Opinion—PCT/US23/070047.
5 Gallon Bucket, United Solutions Store, customer review oldest date May 25, 2022 [online], [site visited Mar. 8, 2024], available from the internet URL: https://www.amazon.com/United-Solutions-Comfortable-Improvement-Household/dp/B09KYFZ3KZ (Year: 2022).
Rambler Beverage Bucket, Yeti, date first available May 4, 2023 [online], [site visited Mar. 8, 2024], available from the internet URL: https://www.amazon.com/YETI-Rambler-Beverage-Double-Wall-Insulated/dp/BOC15PVXW2 (Year: 2023).
Amazon.sg Yeti Rambler Beverage Bucket <https://www.amazon.sg/YETI-Rambler-Beverage-Double-Wall-Insulated/dp/B0CJSMTQLY?th=1> (Year: 2023).
rticoutdoors.com, "Insulated Ice Bucket", RTIC, retrieved on Jan. 30, 2025 from https://rticoutdoors.com/Ice-Bucket?utm_source=google&utm_medium=cpc&utm_campaign=10503502933&gclid=EAlalQobChMI2If2hKW-8glVaE1yCh3tZghBEAQYAiABEgJ6S_D_BWE, 2 pages.
amazon.com, "Coleman 2 Gallon Stacker Beverage Cooler", Coleman, retrieved on Jan. 30, 2025 from https://www.amazon.com/Coleman-Gallon-Stacker-Beverage-Cooler/dp/B00363PRGA/ref=asc_df_B00363PRGA/?tag=hyprod-20&linkCode=df0&hvadid=167131408724&hvpos=&hvnetw=g&hvrand=12309721327539966511&hvpone=&hvptwo=&hvqmt=&hvdev=c&hvdvcmdl=&hvlocint=&hvlocphy=9008183&hvtargid=pla-275271835128&psc=1, 11 pages.
amazon.com, "OXO Ice Bucket and Tongs Set, Brushed Stainless Steel", OXO, retrieved on Jan. 30, 2025 from https://www.amazon.com/OXO-SteeL-Ice-Bucket-Tongs/dp/B007MHJ06E/ref=sr_1_30?dchild=1&keywords=rugged+ice+bucket&qid=1629421276&s=home-garden&sr=1-30, 10 pages.

amazon.com, "King International Stainless Steel Bar Set | Bar Tool Set with Cocktail Shaker Bottle, Ice Picker, Ice Bucket, Tong", King International, retrieved on Jan. 30, 2025 from https://www.amazon.com/King-International-Stainless-Accessories-Cocktail/dp/B07B2WWK5X/ref=sr_1_76?dchild=1&keywords=rugged+ice+bucket&qid=1629421442&s=home-garden&sr=1-76, 7 pages.
homedepot. com, "Bartenders Choice Fun Colors Lemon 3 Qt. Ice Bucket", Kraftware, retrieved on Jan. 30, 2025 from https://www.homedepot.com/pep/Kraftware-Bartenders-Choice-Fun-Colors-Lemon-3-Qt-Ice-Bucket-13966/203087117?source=shoppingads&locale=en-US, 9 pages.
Jan. 2, 20253—(WO) International Search Report & Written Opinion—PCT/US2024/047449.
crateandbarrel.com, "Easton Wine / Champagne Bucket", Crate & Barrel, retrieved on Jun. 11, 2025 from https://www.crateandbarrel.com/easton-wine-champagne-bucket/s406954, 4 pages.
crateandbarrel.com, "Bash Silver Beverage Tub", Crate and Barrel, retrieved on Jun. 11, 2025 from https://www.crateandbarrel.com/bash-silver-beverage-tub/s685699, 5 pages.
Apr. 3, 20250—(CA) First Office Action—App. No. 3262181.
rovrproducts.com, "KeepRTM Cooler Caddy and IceRTM Ice Container", RovR, retrieved on Jun. 11, 2025 from https://rovrproducts.com/products/keepr, 4 pages.
amazon.com, "RTIC Insulated Ice Bucket with Lid, Stainless Steel, Holds 3L of Ice Cold up to 24 Hours, Sweat-Free", RTIC, retrieved on Jun. 11, 2025 from https://www.amazon.com/RTIC-Insulated-Bucket-Stainless-Sweat-Free/dp/B09PFBGZHC, 8 pages.
oxo.com, "Steel Ice Bucket and Tong Set", OXO, retrieved on Jun. 11, 2025 from https://www.oxo.com/shop/coffee-beverage/barware/steel-ice-bucket-tong-set-655.html, 4 pages.
Image of "Lifetime Beverage Bucket" from Williams Sonoma. The photograph cited depicts a bucket to provide to the Patent Office for consideration. Applicant acknowledges, for purposes of prosecution, that the product depicted in this photograph was in the public domain on or before Jul. 19, 2022.
Image of "Generic Beverage Bucket". The photograph cited depicts a bucket to provide to the Patent Office for consideration. Applicant acknowledges, for purposes of prosecution, that the product depicted in this photograph was in the public domain on or before Jul. 19, 2022.
Image of "Luau Beverage Tub". The photograph cited depicts a tub to provide to the Patent Office for consideration. Applicant acknowledges, for purposes of prosecution, that the product depicted in this photograph was in the public domain on or before Jul. 19, 2022.
Image of "Double-Wall Stainless-Steel Insulated Ice Bucket". The photograph cited depicts a bucket to provide to the Patent Office for consideration. Applicant acknowledges, for purposes of prosecution, that the product depicted in this photograph was in the public domain on or before Jul. 19, 2022.
Image of "Double-Wall Insulated Party Bucket". The photograph cited depicts a bucket to provide to the Patent Office for consideration. Applicant acknowledges, for purposes of prosecution, that the product depicted in this photograph was in the public domain on or before Jul. 19, 2022.
Image of "Oasis Galvanized Steel Beverage Pail" from Artland. The photograph cited depicts a pail to provide to the Patent Office for consideration. Applicant acknowledges, for purposes of prosecution, that the product depicted in this photograph was in the public domain on or before Jul. 19, 2022.
Image of "Corona Extra Beer Bucket with Built In Bottle Opener, Silver". The photograph cited depicts a bucket to provide to the Patent Office for consideration. Applicant acknowledges, for purposes of prosecution, that the product depicted in this photograph was in the public domain on or before Jul. 19, 2022.

* cited by examiner

CONTAINER AND METHOD OF FORMING A CONTAINER

CROSS REFERENCE TO RELATED APPLICATIONS

This application is related to the following applications: U.S. application Ser. No. 16/620,766 filed on Dec. 9, 2019, U.S. application Ser. No. 16/075,384 filed on Feb. 3, 2017, and U.S. application Ser. No. 15/285,268, filed on Oct. 4, 2016. The contents of the above listed applications are incorporated herein by reference in their entirety for any and all non-limiting purposes.

FIELD

The present disclosure herein relates broadly to containers, and more specifically to rigid insulated containers used for beverages or foods.

BACKGROUND

A container may be configured to store food and/or a volume of liquid. Containers may be composed of rigid materials, such as a metal. These containers can be formed of a double-wall vacuum-formed construction to provide insulative properties to help maintain the temperature of the food or beverage within the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, an insulating container can be configured to retain a mass of food and/or beverages. The insulated container may comprise: (1) a metallic outer shell comprising an external sidewall and an outer bottom wall; (2) a metallic inner shell comprising an inner sidewall surface and an inner bottom wall; and (3) a support member located between the outer bottom wall and the inner bottom wall. The outer shell may be connected to the inner shell to form an insulated double wall structure with a sealed vacuum cavity between the outer shell and the inner shell. The insulated container may have the insulated container having a top opening at a top of the inner sidewall that leads into a storage cavity formed by the inner sidewall and the inner bottom wall, where the storage cavity may have a volume greater than 1800 cubic centimeters. The top opening may have a width within a range of 240 mm and 250 mm. Additionally, the support member may be secured between the outer bottom wall and the inner bottom wall with a friction fit and may comprise a ceramic fiber insulation. The support member may also have a porosity of greater than 60 percent and may also have a thermal conductivity within a range of 0.013 W/(m*K) and 0.040 W/(m*K). In some examples, a height of the support member is reduced at least 30 percent from a height of the support member in an uncompressed state. The inner bottom wall of the container may have a central region that is substantially planar. The outer bottom wall may have a lower ring-shaped cavity, where the lower ring-shaped cavity may include a continuous inner cavity wall and a continuous outer cavity wall. The inner cavity wall of the lower ring-shaped cavity may be adjacent the support member, and in some cases, the inner cavity wall of the lower ring-shaped cavity may be adjacent the support member along the entire inner cavity wall.

Aspects of this disclosure may also relate to a method of forming an insulated container comprising: (1) forming a metallic outer shell with a first opening at a top end of the outer shell, where the outer shell comprises an outer sidewall and an outer bottom wall; (2) forming an metallic inner shell with a second opening at a top end of the inner shell, wherein the inner shell has an inner sidewall and an inner bottom wall; (3) placing a support member onto the outer bottom wall comprises a ceramic material; (4) placing the inner shell into the first opening of the outer shell, the inner bottom wall contacts an upper surface of the support member; (5) positioning an upper edge of the inner shell to align with an upper edge of the outer shell to compress the support member, wherein the support member is compressed to reduce a height at least 30 percent from a height of the support member in an uncompressed state; (6) integrally joining the upper edge of the inner shell to the upper edge of the outer shell; and (7) evacuating a mass of gas from a cavity between the outer shell and the inner shell to form a vacuum sealed cavity between the outer shell and the inner shell. The outer shell may include includes a lower cavity on the outer bottom wall, and the lower cavity may comprise an inner cavity wall, an outer cavity wall, and a bottom cavity wall, where the inner cavity wall forms a continuous loop. In addition, the bottom cavity wall may include three holes by which the mass of gas is evacuated. The support member may be placed within the continuous loop formed by the inner cavity wall. In some examples, the outer shell and the inner shell may be formed from stainless steel. The support member may have a thermal conductivity within a range of 0.013 W/(m*K) and 0.040 W/(m*K). where the support member comprises ceramic fiber insulation. The insulated container may have a diameter at a top opening within a range of 230 mm and 260 mm, and a storage cavity has a height within a range of 180 mm and 220 mm.

Still other aspects of this disclosure may relate to an insulated container comprising: (1) a metallic outer shell comprising an outer sidewall and an outer bottom wall, where the bottom outer wall has a lower ring-shaped cavity, the lower ring-shaped cavity including an inner cavity wall, an outer cavity wall, and a bottom cavity wall; (2) a metallic inner shell comprising an inner sidewall and an inner bottom wall, where the inner bottom wall includes a planar central region; (3) a support member located between the outer bottom wall and the inner bottom wall, where the support member is located adjacent the inner cavity wall. The support member may be compressed greater than 30 percent from an uncompressed state. In addition, the outer shell may be integrally joined to the inner shell forming an insulated double wall structure with a sealed vacuum cavity between the outer shell and the inner shell. The insulated container may have a top opening extending into a storage cavity, where the storage cavity has a volume within a range of 1800 cubic centimeters and 4000 cubic centimeters. The insulated container may also include a foot bracket connected to the lower ring-shaped cavity, where the foot bracket includes a pair of engaging members, and where an elastomeric foot member is connected to the foot bracket.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure. Also, while the terms "top," "bottom," "front," "side," "rear," and the like may be used in this specification to describe various example features and elements of the examples, these terms are used herein as a matter of convenience, e.g., based on the example orientations shown in the figures or the orientation during typical use. Nothing in this specification should be construed as requiring a specific three-dimensional orientation of structures in order to fall within the scope of this disclosure.

The following terms are used in this specification, and unless otherwise noted or clear from the context, these terms have the meanings provided below.

"Integral joining technique," as used herein, means a technique for joining two pieces so that the two pieces effectively become a single, integral piece, including, but not limited to, irreversible joining techniques, such as adhesively joining, cementing, welding, brazing, soldering, or the like, where separation of the joined pieces cannot be accomplished without structural damage thereto. Pieces joined with such a technique are described as "integrally joined."

"Plurality," as used herein, indicates any number greater than one, either disjunctively or conjunctively, as necessary, up to an infinite number.

"Substantially planar," as used herein, means that a surface is flat or contained within a plan and varies no more than +/−5%.

Figure 1:
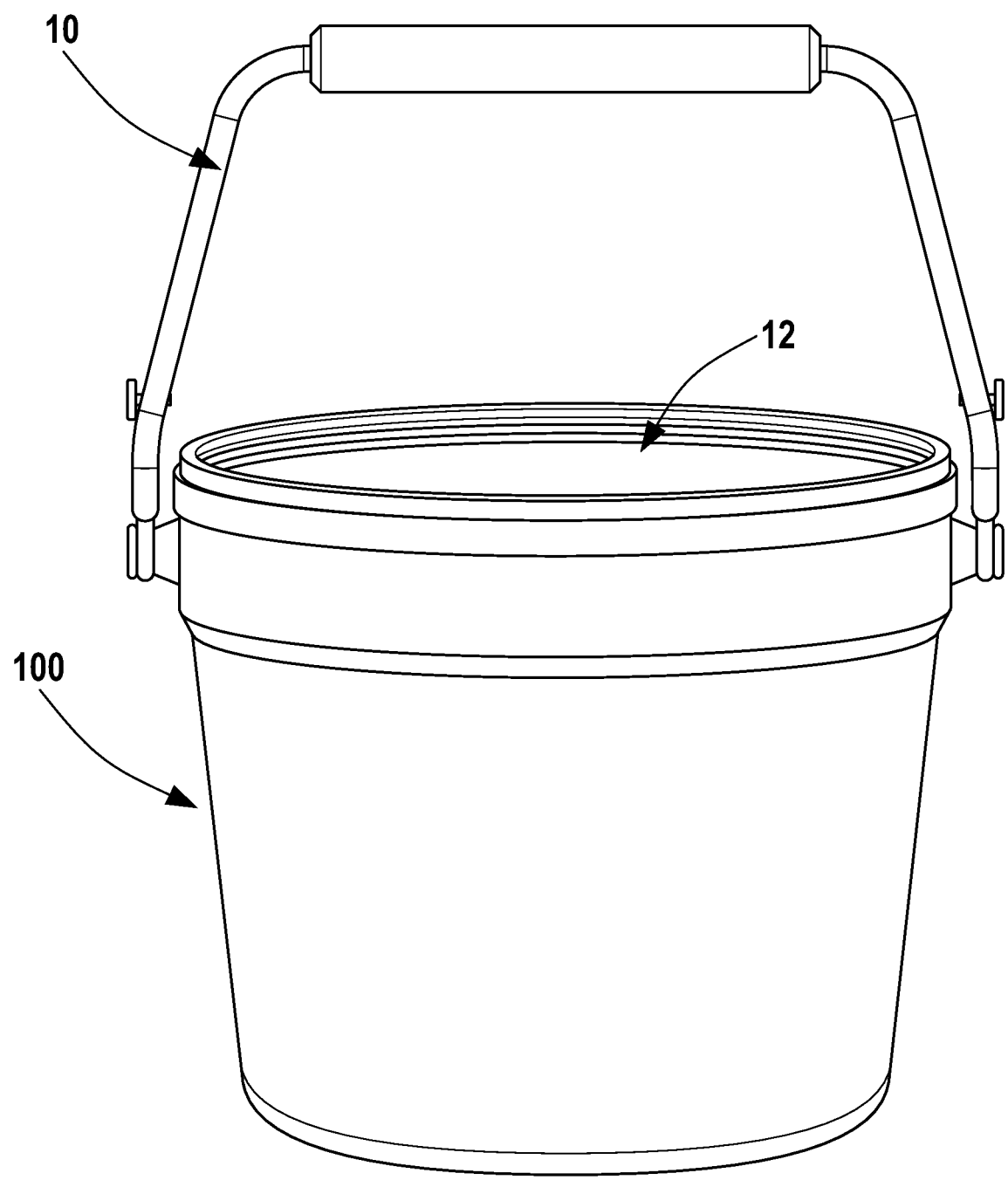
FIG. 1 depicts a perspective view of an insulating container with a carrying handle attached, according to one or more aspects described herein.
Figure 2:
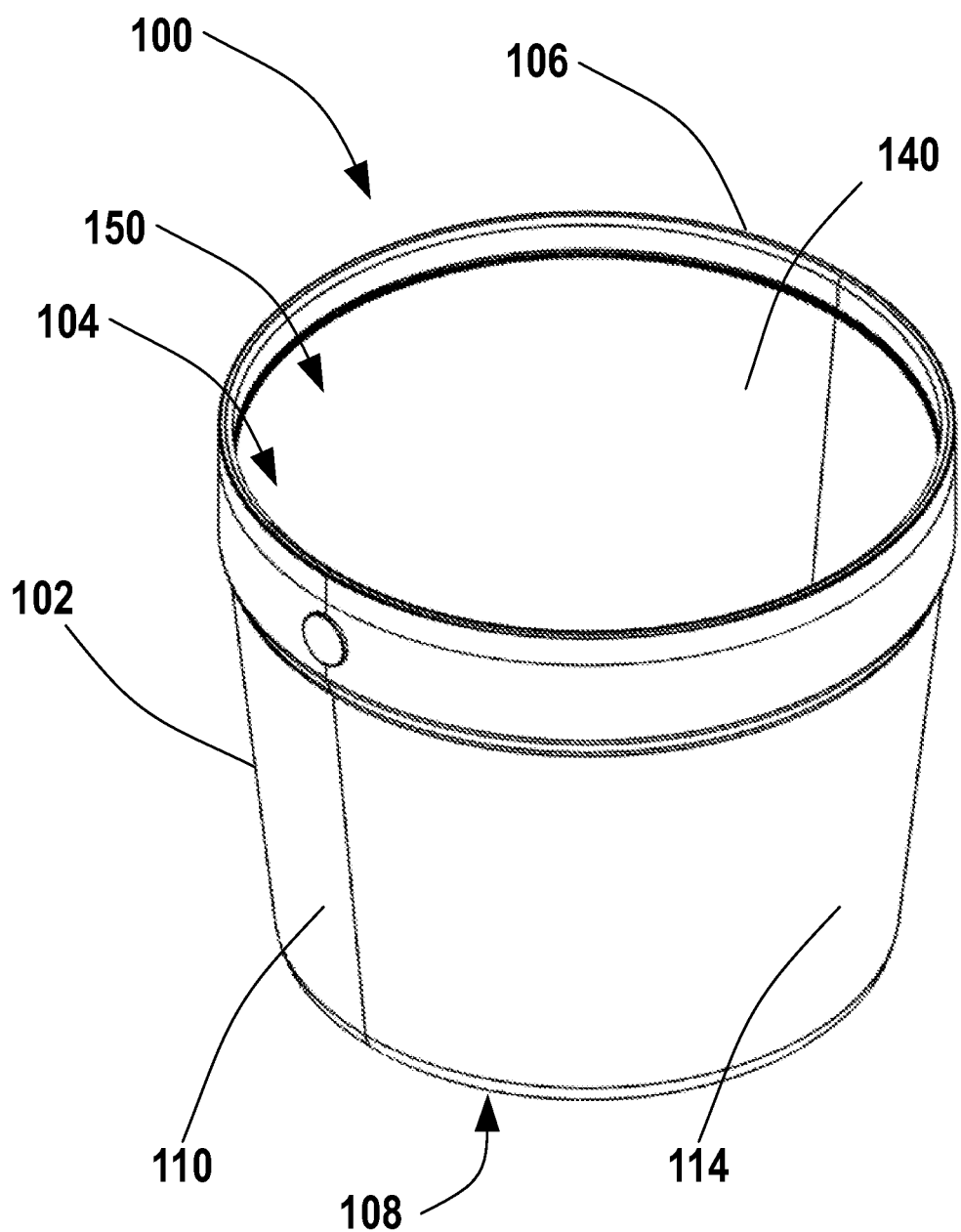
FIG. 2 depicts a perspective view of an insulating container of FIG. 1 without the carrying handle, according to one or more aspects described herein.
Figure 3:
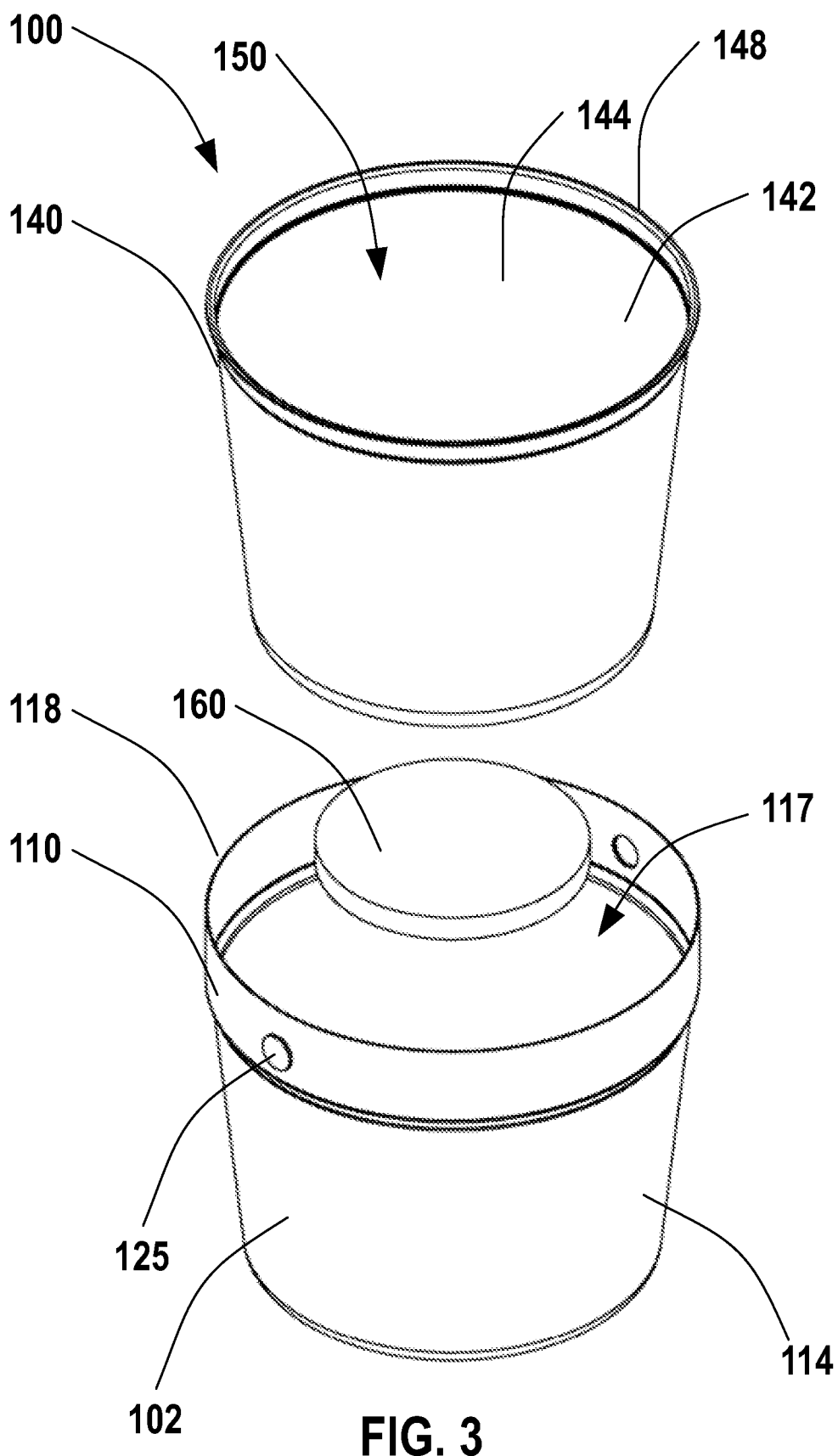
FIG. 3 depicts a perspective exploded view of the insulating container of FIG. 2, according to one or more aspects described herein.
Figure 4:
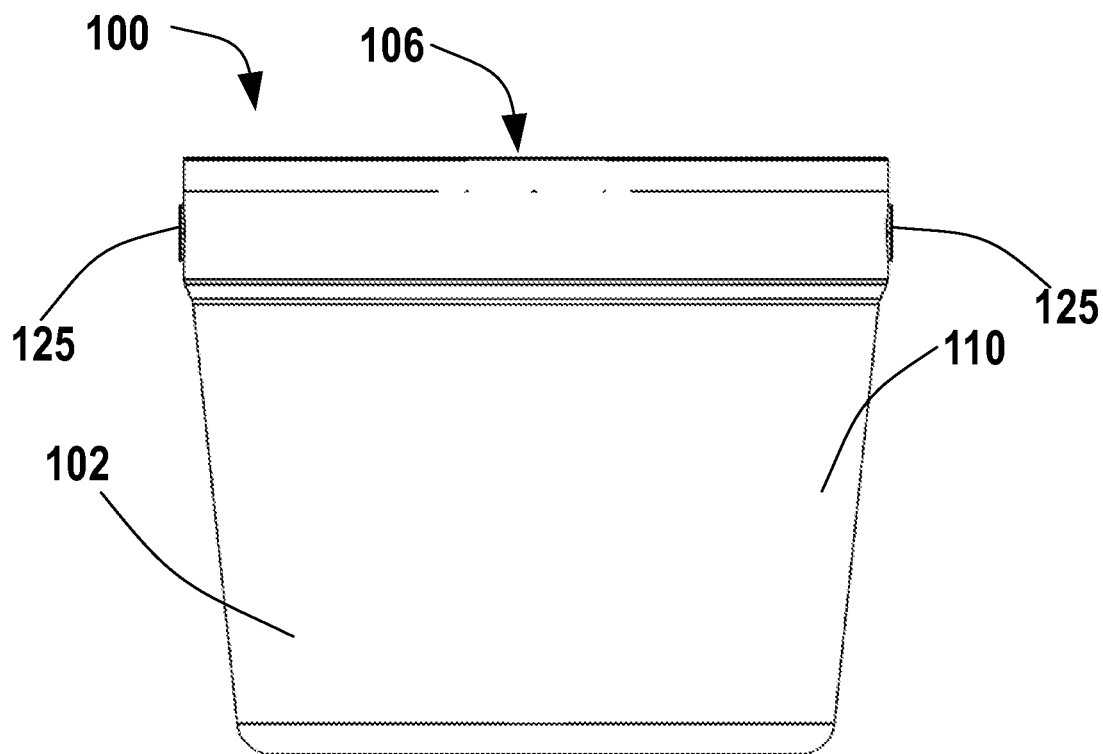
FIG. 4 depicts a front view of the insulating container of FIG. 2, according to one or more aspects described herein.
Figure 5:
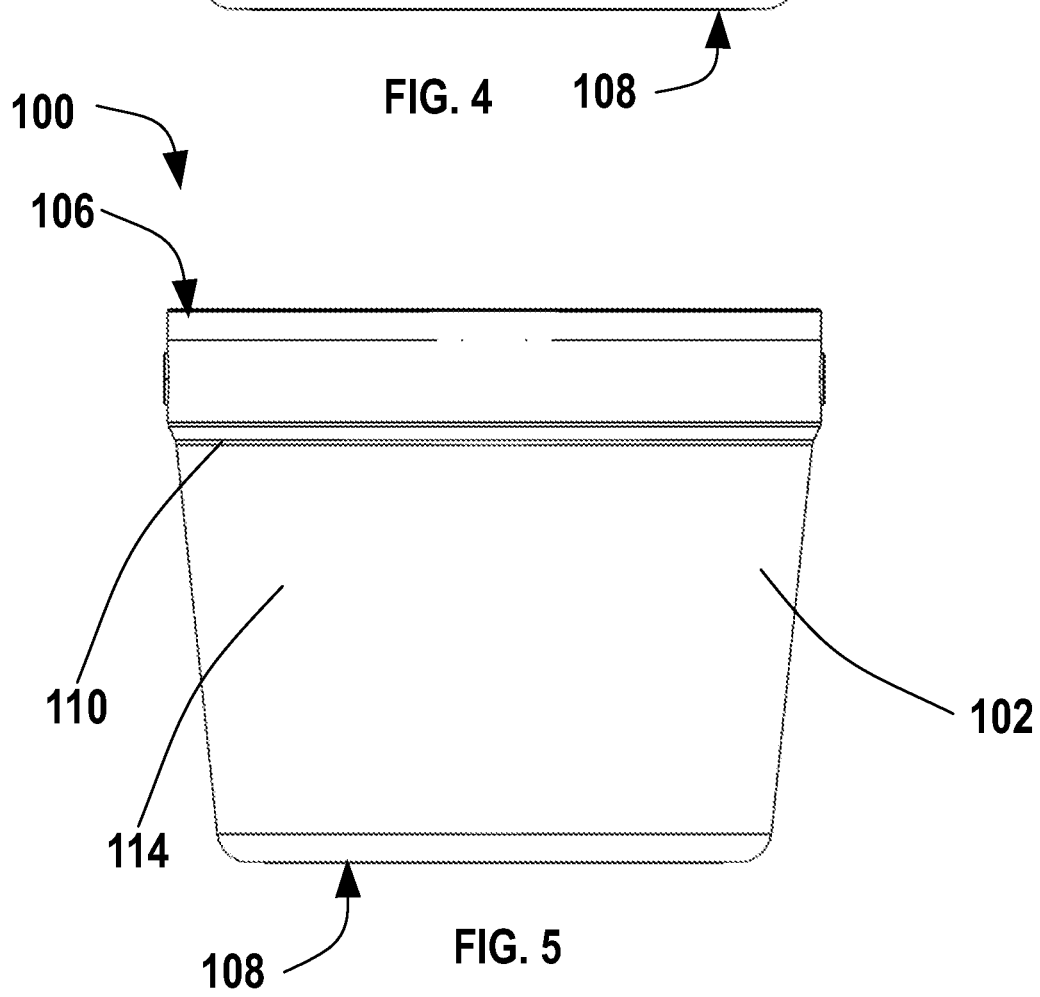
FIG. 5 depicts a rear view of the insulating container of FIG. 2, according to one or more aspects described herein.
Figure 6:
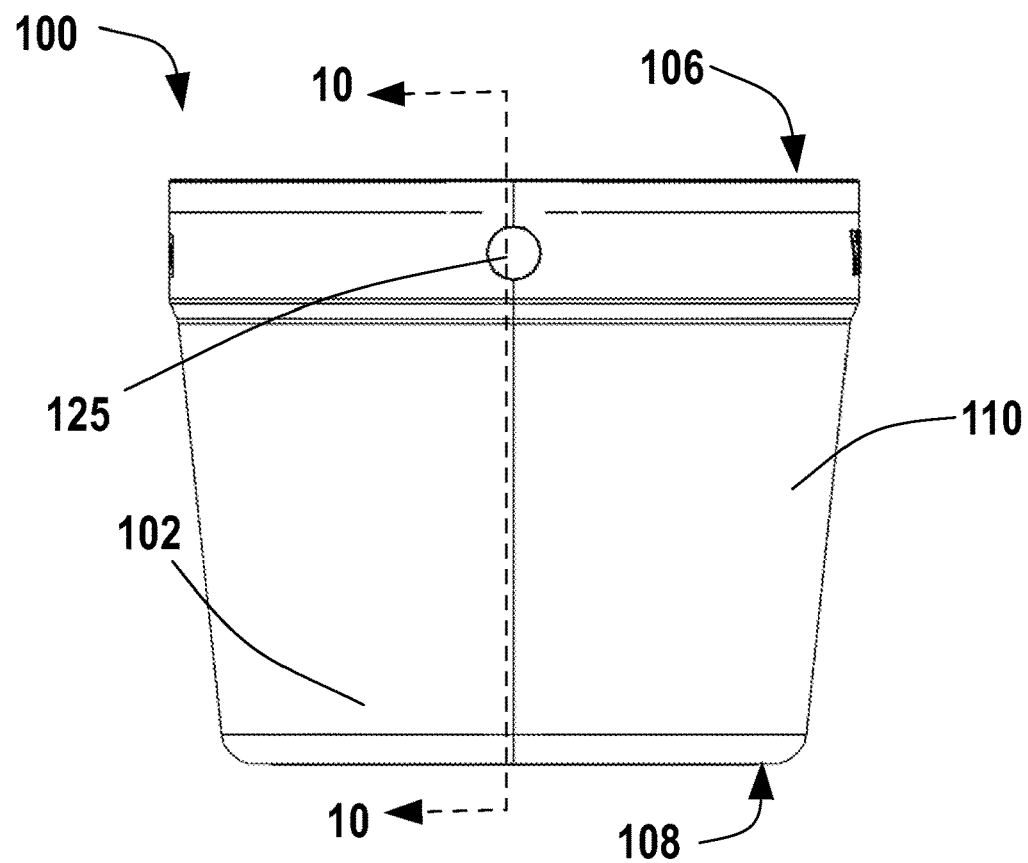
FIG. 6 depicts a right side view of the insulating container of FIG. 2, according to one or more aspects described herein.
Figure 7:
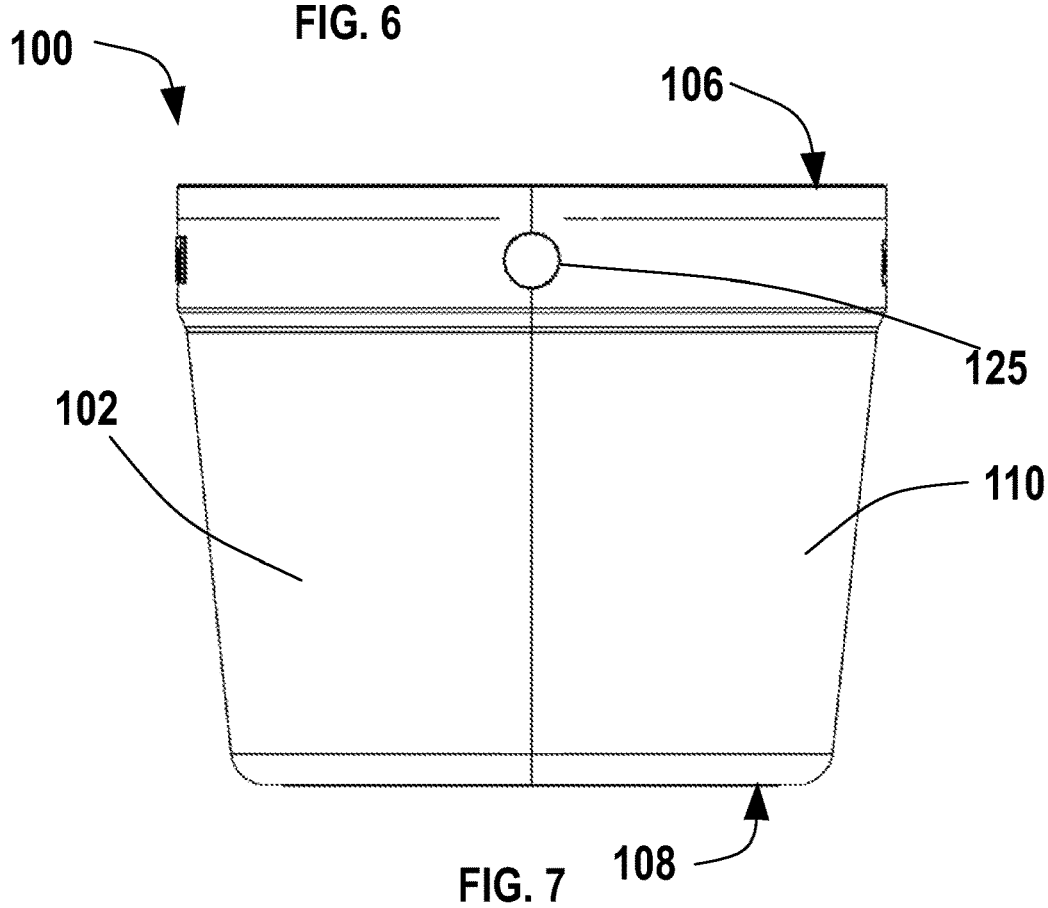
FIG. 7 depicts a left side view of the insulating container of FIG. 2, according to one or more aspects described herein.

Aspects of this disclosure relate to an insulating container. FIGS. 1-12 depict an insulating container 100 with FIG. 1 depicting an isometric view of insulating container 100 with a carrying handle 10 and lid 12 attached. The insulating container 100 may function as a bucket or other container for holding oversized items or fluid. FIG. 2 illustrates the insulating container 100 with the carrying handle 10 and lid 12 removed. In the illustrated example, the insulating container 100 may generally have a shape that is similar to a truncated cone with a tapered external sidewall 102. The insulating container 100 may have a top opening 104 at an upper end 106 of the container 100 while the lower end 108 is configured to sit on a flat surface. As shown in FIG. 3, the insulating container 100 may be formed from an outer shell 110 that is joined to an inner shell 140 with a support member 160 secured between the outer shell 110 and the inner shell 140. The outer shell 110 may include an outer bottom wall 112 and the external sidewall 102, which may include an outward facing surface 114. The inner shell 140 may include an inner sidewall 142, where the inner sidewall 142 may include an inner sidewall surface 144 and an inner bottom wall 146. The top opening 104 at the upper end 106 may extend into a storage cavity 150 that may be configured to hold a liquid or food. The storage cavity 150 may be formed by the inner sidewall surface 144 and the inner bottom wall 146. The support member 160 may be located between the outer bottom wall 112 of the outer shell 110 and the inner bottom wall 146 of the inner shell 140. While the illustrated example has a truncated conical shape, the shape of the container 100 may be any shape such as a rectangular cuboid, a generally cylindrical shape, or other three-dimensional shape that could hold items or fluid.

Figure 9:
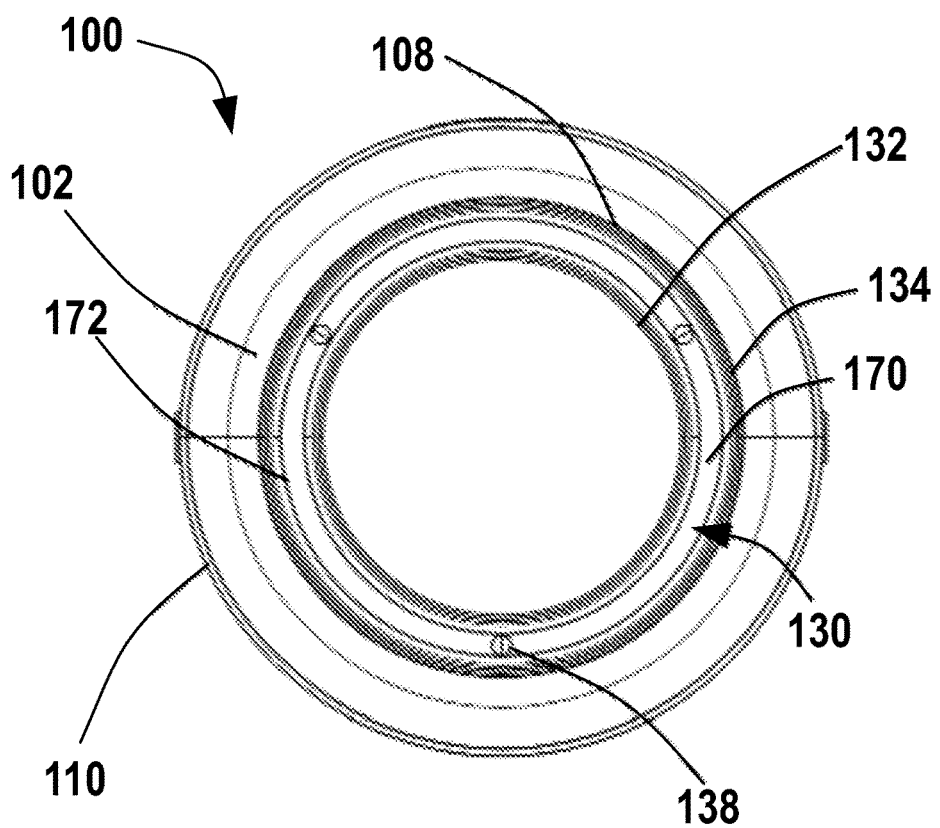
FIG. 9 depicts a bottom view of the insulating container of FIG. 2 with the foot member removed, according to one or more aspects described herein.

In the exemplary implementation, the insulated container 100 may comprise a double wall construction that may be a vacuum-insulated double wall structure with the outer shell 110 connected to the inner shell 140. The double wall construction may form a sealed vacuum cavity 120 between the outer shell 110 and the inner shell 140 as shown in FIG. 9. A portion of the sealed vacuum cavity 120 may include an insulating or support member 160. The support member 160 may comprise a single member or a plurality of structures. The support member 160 may be located between the outer bottom wall 112 of the outer shell 110 and the inner bottom wall 146 of the inner shell 140. The support member 160 may be secured between the outer bottom wall 112 and the inner bottom wall 146 with a friction fit due to the compression of the support member 160 during assembly. In some examples, the support member 160 may be secured to either or both of the outer bottom wall 112 and the inner bottom wall 146 using an adhesive. Additionally, the support member 160 may be secured in place by features that may be located on either or both of the outer bottom wall 112 and the inner bottom wall 146. These features may surround or partially surround the support member 160. The support member 160 may be one or more discrete structures arranged in an array, or a single structure that partially or fully fills a lower cavity 122 of the sealed vacuum cavity 120 that is formed between inner cavity wall 132 of the outer shell 110 and the inner shell 140.

The container 100 may be sized to contain oversized items and may function as an insulated bucket or container. For instance, the container 100 may hold a volume greater 1800 cubic centimeters. In some examples, the container 100 may hold a volume within a range of 1900 cubic centimeters and 3000 cubic centimeters, or within a range of 1800 cubic centimeters and 4000 cubic centimeters, or greater even greater than 4000 cubic centimeters. In the illustrated example, the top opening 104 may have a width, W, or diameter within a range of 240 mm and 250 mm, or within a range of 230 mm and 260 mm, where the width, W, is defined as a horizontal distance across the widest part of the storage cavity 150. In addition, the storage cavity 150 of the container 100 may have a height greater than 160 mm, or within a range of 160 mm and 240 mm, or within a range of 180 mm and 220 mm, where the height, H, is defined a vertical distance between the upper end 106 of the top opening 104 and inner bottom wall 146. The width, W, may be greater than the height, H. In addition, the width and height may be expressed as a ratio to each other. For instance, the ratio of the width, W, of the top opening 104 to the height, H, of the storage cavity may be approximately 1.23:1, or within a range of 1.31:1 and 1.14:1, or within a range of 1.44:1 and 1.1:1. In examples that may have a different shape than the illustrated example, such as a rectangular cuboid, the container 100 may have exterior dimensions of a height within a range of 300 mm and 400 mm, a length within a range of 430 mm and 530 mm, and a width within a range of 300 mm and 400 mm as well as an internal volume within a range of 1800 cubic centimeters and 4000 cubic centimeters.

Figure 8:
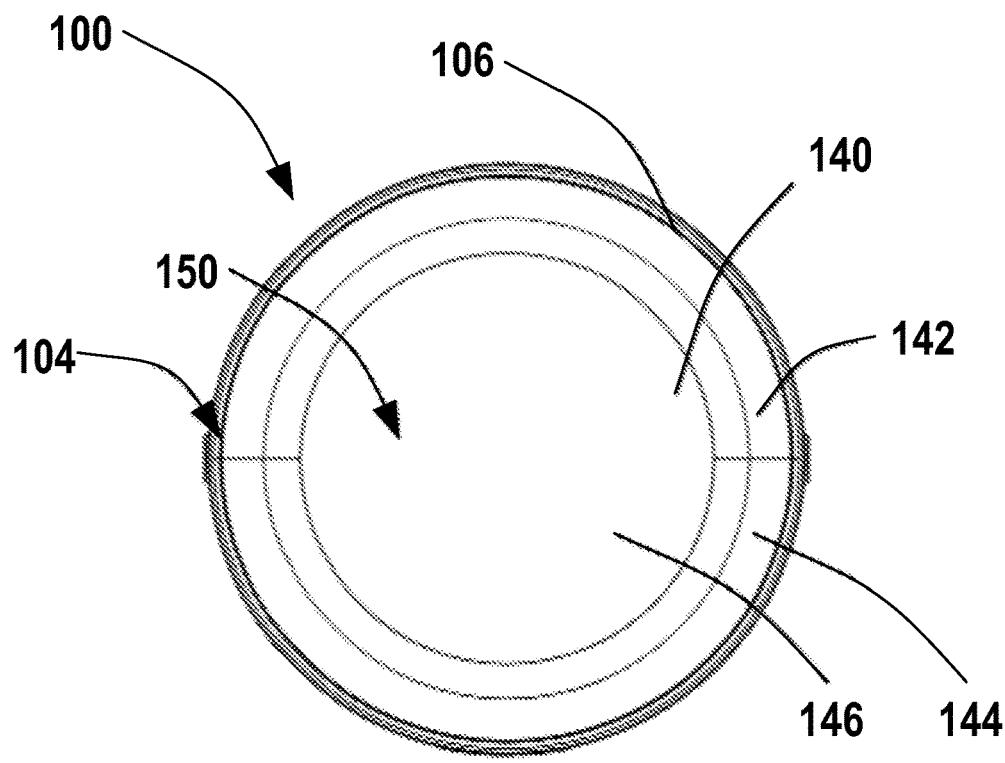
FIG. 8 depicts a top view of the insulating container of FIG. 2, according to one or more aspects described herein.
Figure 10:
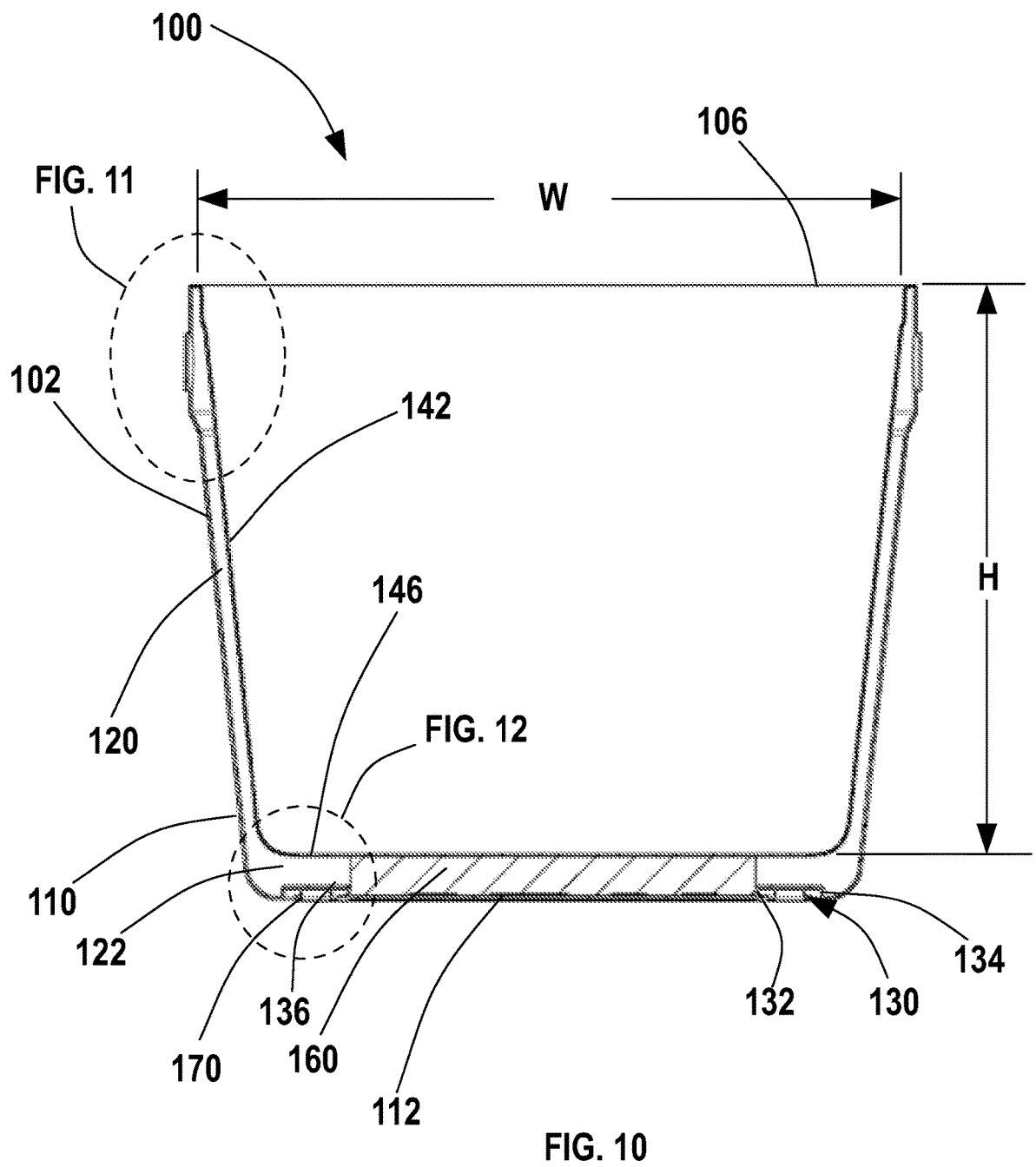
FIG. 10 depicts a cross-sectional view of the insulating container of FIG. 2 with the foot member removed along line 10-10, according to one or more aspects described herein.
Figure 12:
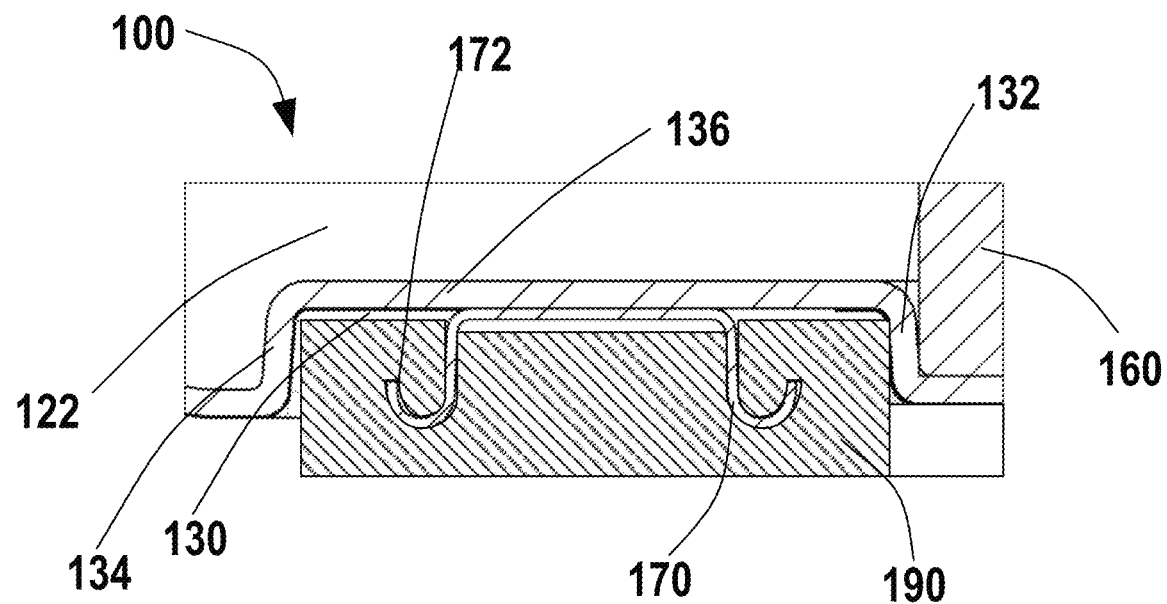
FIG. 12 depicts an enlarged view of FIG. 10 with the foot member attached, according to one or more aspects described herein.

As shown in FIGS. 8, 10, and 12, the container 100 may include a foot member 190 to provide a slip resistant surface to support the container 100. A foot member 190 may be attached to the outer bottom wall 112. The outer bottom wall 112 may include a lower cavity 130. The lower cavity 130 may include an inner cavity wall 132, an outer cavity wall 134, and a bottom cavity wall 136. The lower cavity 130 may be ring-shaped such that the inner cavity wall 132 and the outer cavity wall 134 each form a continuous loop that are spaced apart from each other. The support member 160 may be placed within the continuous loop formed by the inner cavity wall 132. The inner cavity wall 132 of the lower cavity 130 may be adjacent to and in some cases contact the support member 160 as shown in FIG. 12. The inner cavity wall 132 may help secure and align the support member 160 so the support member 160 is properly located and stays in place as it is compressed during the assembly of the container 100. While the illustrated example includes a ring-shaped lower cavity 130, the lower cavity may have other shapes such as a square, circular, oval, or other geometric shape. In other examples, the lower cavity 130 may comprise a plurality of cavities 130 arranged in a manner such that at least a portion of the cavity walls can help to secure and position the support member 160. Additionally, in examples with multiple lower cavities, each of the lower cavities may include a separate foot member, or a foot member than has a portion that is received in each of the lower cavities.

A foot bracket 170 may be located in the lower ring-shaped cavity 130. The foot bracket 170 may be connected to the bottom cavity wall 136 and may include a hook member or a plurality of hook members 172 that engage and secure the elastomeric foot member 190. The foot member 190 may be ring-shaped and form a slip resistant surface to support the container 100. In addition, a plurality of openings 138 may be located along the bottom cavity wall 136. The openings 138 may be round shaped holes and may be evenly spaced around the lower ring-shaped cavity 130. In the illustrated example, the plurality of openings 138 comprises three openings, but the number of openings may be two openings, four openings, or more than four openings. As discussed below, the openings 138 may assist in evacuating the gas from the cavity formed between the outer and inner shells 110, 140. In addition, the holes 138 may be aligned with similar openings 174 arranged along a bottom surface of the foot bracket 170.

Figure 11:
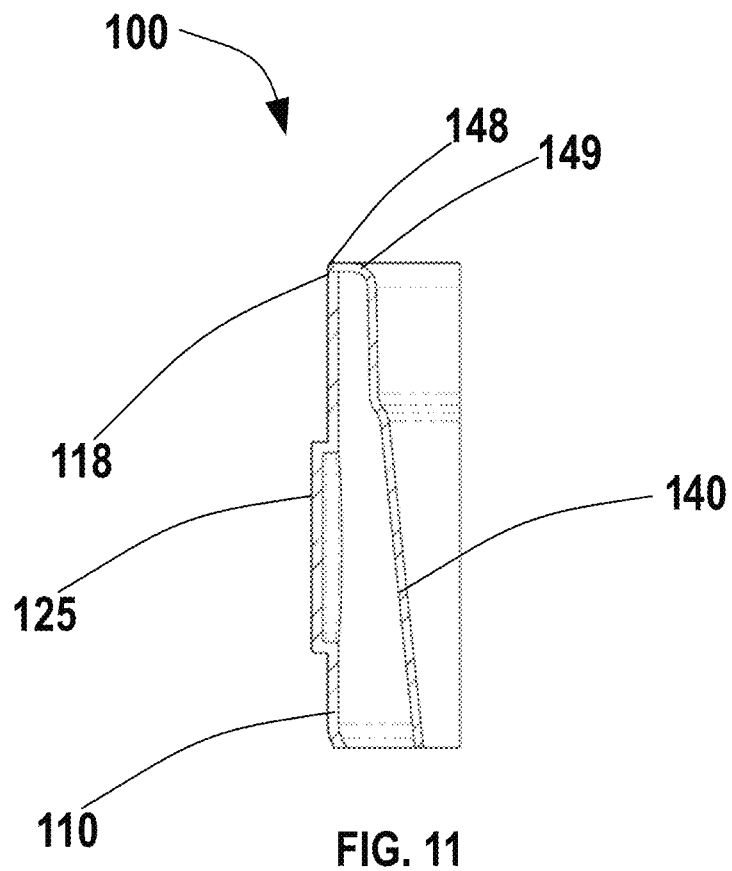
FIG. 11 depicts an enlarged view of FIG. 10, according to one or more aspects described herein.

FIG. 11 illustrates a partial cross-section of the upper portion of the container 100. The outer shell 110 may include a protruding member 125 that is configured to receive an attachment member of the handle 10 that can attach to the container 100. In addition, the inner shell 140 have a lip 149 that flares outward to the upper edge 148 that contacts the upper edge 118 of the outer shell 110.

Figure 13:
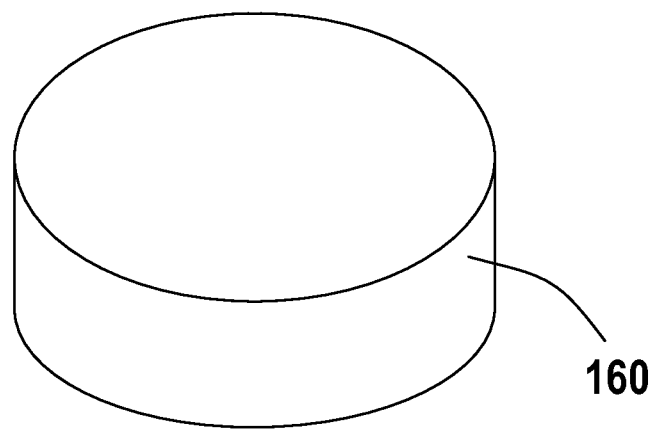
FIG. 13 depicts a perspective view of the support member of the container of FIG. 2, according to one or more aspects described herein.
Figure 14:
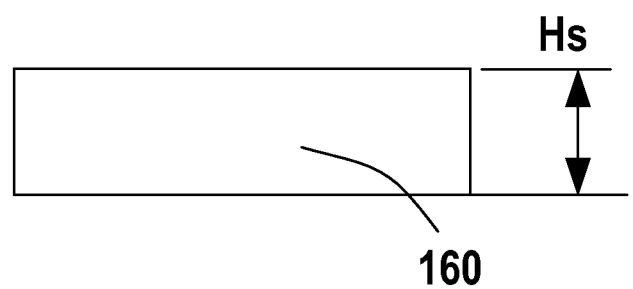
FIG. 14 depicts a side view of the support member of FIG. 13, according to one or more aspects described herein.

FIGS. 13 and 14 illustrate the support member 160. The support member 160 may help to stabilize the inner bottom wall 146. While the illustrated example of the support member 160 has a cylindrical shape, the support member 160 may have a different shape such as a cuboid, cone, or other similar shape. In some examples, the support member 160 may comprise multiple members that are joined together to form the support member 160 or may comprise multiple members arranged between the outer bottom wall 112 and the inner bottom wall 146 to provide structural stiffness between the two walls 112, 146. As the sealed vacuum cavity 120 is formed between the outer shell 110 and the inner shell 140, an overall height, Hs, of an uncompressed support member 160 may be reduced (e.g. compressed) by at least 30 percent. The height, Hs, of an uncompressed state may be defined as the height, Hs, of the support member 160 prior to installing the support member 160 into the outer shell 110 when forming the container 100 as described in more detail below. In other examples, the height, Hs, may be reduced by at least 50 percent from the height, Hs, of the support member 160 in an uncompressed state. The compression of the support member 160 may produce a force onto the inner bottom wall 146 of the inner shell 140 to help stabilize the inner bottom wall 146 and prevent any deformation of the inner bottom wall 146 to keep the inner bottom wall 146 substantially planar forming a central region of the inner bottom wall 146 that is substantially planar. The central region may have an area that is approximately 80 percent of the inner bottom wall 146, or may have a surface area greater than 150 square centimeters, or within a range of 150 square centimeters and 240 square centimeters. In some examples, the central region may exceed 240 square centimeters.

The support member 160 may be formed from an insulating material while also being compressible. The support member 160 may be a foam, a lattice structure, a honeycomb structure, or other solid insulating structure. In some examples, the support member 160 may also include or be formed from a heat resistant material. As discussed in more detail below when the container 100 is subjected to a vacuum during construction, the container 100 (and its components) may also be subjected high temperatures (i.e. greater than 200° C.), which may make some polymeric or fiber glass insulation materials unsuitable for use in the support member 160. As such, the support member may be also heat resistant such as a heat resistant ceramic fiber insulation, an aerogel material, a ceramic fiber mat, or similar heat resistant insulation material, in addition, the support member 160 may be formed from, a ceramic material, a mineral wool material, a ceramic foam, an aerogel-based material (e.g. an aerogel blanket, an aerogel block, or similar aerogel structure), an organic material, or other high-temperature fiber-reinforced material. The support member 160 may also have a degree of porosity to help provide compressibility as wells as the desired insulating properties. For example, the support member 160 may have a porosity of greater than 60 percent, or greater than 80 percent, or even greater than 90 percent. Alternatively, the support member 160 may be incompressible, such as a fiber mat or blanket, or may be loose granules or particles that are located between the outer bottom wall 112 and the inner bottom wall 146.

The support member 160 may comprise an insulating material with a low thermal conductivity. The low thermal conductivity prevents a direct conduction pathway between the inner shell 110 and the outer shell 140. By preventing or reducing any direct conduction pathways between the shells 110, 140, the support member 160 along with the sealed vacuum cavity 120 may help to reduce or eliminate condensation due to the lack of a conduction pathway between the walls 102, 112, 142, 146 of the shells 110, 140. For example, the support member 160 may have a thermal conductivity within a range of 0.013 W/(m*K) and 0.040 W/(m*K).

In some examples, additional support members 160 may be located in different regions of the vacuum cavity 120 to help prevent or reduce deformation of one or more surfaces of the insulating container 100.

Figure 15:
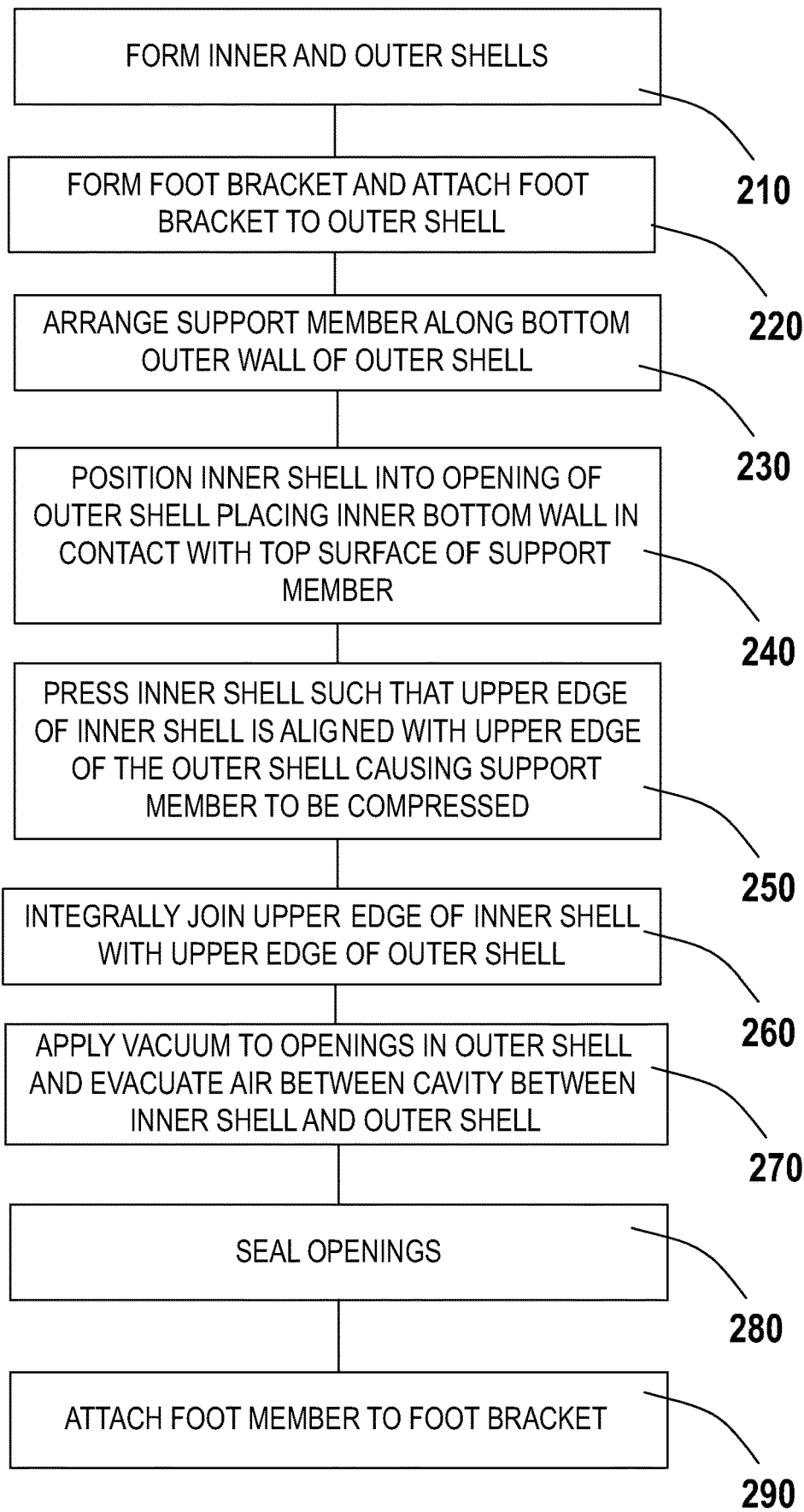
FIG. 15 depicts a flowchart of a method for forming the container of FIG. 2, according to one or more aspects described herein.

FIG. 15 illustrates a flowchart of a method of forming the insulated container 100. First, the outer and inner shells 110, 140 may be formed (210) as two separate pieces. The outer and inner shells 110, 140 may have a substantially constant wall thickness. The outer and inner shells 110, 140 may be constructed using one or more sheet-metal deep-drawing and/or stamping processes, and using, in one example, stainless steel sheet-metal. However, it will be readily appreciated that the insulating container 100 may be constructed using one or more additional or alternative metals and/or alloys, one or more fiber-reinforced materials, one or more polymers, or one or more ceramics, or combinations thereof, among others, without departing from the scope of these disclosures. Accordingly, one or both of the outer shell 110 and the inner shell 140 may have wall thicknesses (i.e. may utilize a sheet-metal thickness) ranging at or between 0.2 mm to 4 mm or approximately 0.5 mm, 1 mm, 1.5 mm, 2 mm, 2.5 mm, 3 mm, 4 mm, among others.

Next, the foot bracket 170 may be formed and connected to the outer shell 110 (220). The foot bracket 170 may include one or more hook members 172 that are attached to the bottom cavity wall 136 of the lower cavity 130. Similar to the outer and inner shells 110, 140, the foot bracket 170 may be formed from stainless steel and may be formed from a sheet metal forming process or alternatively, the foot bracket 170 may be formed via casting, forging, or molding. The foot bracket 170 may then be integrally joined to the outer shell 110 within the lower cavity 130.

In the next steps, the support member 160 may be secured between the inner shell 140 and the outer shell 110. First, the support member 160 may be placed onto an interior surface of the outer bottom wall 112 adjacent to the inner cavity wall 132 of the outer shell 110 (230). Next, the inner shell 140 may be placed into the opening 117 of the outer shell 110 until the outer surface of the inner bottom wall 146 contacts an upper surface of the support member 160 (240). In the next step, the inner shell 140 may be pressed until the upper edge 148 of the inner shell 140 aligns with an upper edge 118 of the outer shell 110. During this process, the support member 160 is compressed from an uncompressed state until the compressed state (250).

Once the support member 160 is compressed and the upper edges 118, 148 of the outer and inner shells 110, 140 are aligned, the inner shell 140 may be integrally joined to the outer shell 110 by one or more coupling processes along the upper edges 118, 148 of the outer shell 110 and the inner shell 140 (260). In one specific example, the inner shell 140 may be secured to the outer shell 110 by a welding operation utilizing a robotic arm and camera system in conjunction with a stationary electrode or the like to ensure that inner shell 140 is connected along the entire upper edges 118, 148 of the outer shell 110 and the inner shell 140. These coupling processes may integrally join the outer shell 110 and the inner shell 140 and may include one or more brazing or welding processes (including, among others, shielded metal arc, gas tungsten arc, gas metal arc, flux-cored arc, submerged arc, electroslag, ultrasonic, cold pressure, electromagnetic pulse, laser beam, or friction welding processes). In another example, the outer shell 110 may be integrally joined to the inner shell 140 by one or more adhesives, by a sheet metal hem joint, or by one or more fastener elements (e.g. one or more screws, rivets, pins, bolts, or staples, among others).

Once the shells 110, 140 are integrally joined and secure the support member 160, a mass of gas/air may be evacuated from the cavity formed between the inner and outer shells 140, 110 to create a sealed vacuum cavity 120 between the two shells 110, 140 (270). To achieve a vacuum between the walls of the container 100 (e.g. between the outer sidewall 102 and the inner sidewall 142, and the outer bottom outer wall 112 and the inner bottom wall 146), at least a portion of air between the two shells 110, 140 may be removed by positioning the container 100 within a larger chamber (not depicted), and removing at least a portion of the air from the cavity 120 between the shells 110, 140 by pulling a vacuum within the larger chamber (not depicted) (e.g. reducing an internal pressure of the larger chamber to a pressure below an internal pressure within the vacuum cavity 120). It will be appreciated that any techniques and/or processes may be utilized to reduce a pressure within the larger chamber (not depicted), including, vacuum pumping, among others. As such, a portion of air within the vacuum cavity 120 may escape through a plurality of openings 138 located in the bottom cavity wall 136 of the lower cavity 130 located on the outer bottom wall 112. The openings 138 may be round shaped holes and may be evenly spaced around the lower ring-shaped cavity 130. In addition, the openings or holes 138 may be located in the bottom cavity wall 136 and also be aligned with holes 174 arranged in the foot member such that the vacuum may be applied after the foot member 190 is applied to the outer shell 110.

In certain implementations, a pressure within the vacuum cavity 120 of the insulating container 100 may measure less than 15 μTorr. In other examples, the vacuum may measure less than 10 μTorr, less than 50 μTorr, less than 100 μTorr, less than 200 μTorr, less than 400 μTorr, less than 500 μTorr, less than 1000 μTorr, less than 10 mTorr, less than 100 mTorr, or less than 1 Torr, among many others. The support member 160 may help prevent any deformation caused by a pressure differential between a pressure external to the insulating container 100 (i.e. atmospheric pressure), and an internal vacuum pressure within the vacuum cavity 120 and outside the container 100. The support member 160 may provide additional structural rigidity and support along the inner bottom wall 146 to prevent the walls from deforming and helping to keep the inner bottom wall 146 substantially planar.

In order to seal a vacuum within the vacuum cavity 120, a resin, which may be in the shape of a pill, may be placed into the openings 138 during the vacuum forming process (280). In some examples, the vacuum formation chamber may be heated to a temperature at which the resin may become viscous. In one example, the viscosity of the resin may be such that the resin does not flow or drip into the container through the opening, but is permeable to air such that the air can escapes the internal volumes of the vacuum cavity 120. In one implementation, a vacuum forming process may heat the insulating container 100 to temperature of approximately 550° C. In other implementations, during the vacuum forming process the insulating container may be heated to approximately 200° C., 250° C., 300° C., 350° C., 400° C., 450° C., 500° C., or 600° C., among others. Following a period of heating, the insulating container 100 may be passively or actively cooled to room temperature. As such, once the resin cools and solidifies, it covers the openings 138, and seals the internal volume of the container 100 to form a vacuum cavity 120 between the outer shell 110 and the inner shell 140.

Lastly, a foot member 190 may be installed onto the foot bracket 170 (290). The foot member 190 may be secured with a press fit or friction fit onto the hook members 172 of the foot bracket 170. The foot member 190 may be formed from an elastomeric material to help increase the friction and help prevent the container 100 from sliding when placed on a flat surface.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. An insulated container comprising:
    a metallic outer shell comprising an external sidewall and an outer bottom wall, wherein the outer bottom wall has a lower ring-shaped cavity spaced inward from the external sidewall, the lower ring-shaped cavity including a continuous inner cavity wall and a continuous outer cavity wall;
    a metallic inner shell comprising an inner sidewall and an inner bottom wall;
    the outer shell connected to the inner shell forming an insulated double wall structure with a sealed vacuum cavity between the outer shell and the inner shell, wherein an upper edge of the inner shell is integrally joined to an upper edge of the outer shell;
    the insulated container having a top opening at a top of the inner sidewall that leads into a storage cavity formed by the inner sidewall and the inner bottom wall; and
    a support member located between the outer bottom wall and the inner bottom wall, wherein the support member contacts the inner shell and the outer shell and wherein a height of the support member is reduced at least 30 percent from a height of the support member in an uncompressed state, and wherein the support member is free of contact with the external sidewall; and
    wherein the storage cavity has a volume greater than 1800 cubic centimeters.

2. The insulated container of claim 1, wherein a width of the top opening is within a range of 240 mm and 250 mm, and wherein the width of the top opening is greater than a height of the storage cavity.

3. The insulated container of claim 1, wherein the support member is secured between the outer bottom wall and the inner bottom wall with a friction fit.

4. The insulated container of claim 1, wherein the support member comprises a ceramic fiber insulation.

5. The insulated container of claim 1, wherein the support member has a thermal conductivity within a range of 0.013 W/(m*K) and 0.040 W/(m*K).

6. The insulated container of claim 1, wherein a central region of the inner bottom wall is substantially planar.

7. The insulated container of claim 1, wherein the inner cavity wall of the lower ring-shaped cavity is adjacent the support member.

8. The insulated container of claim 1, wherein the support member has a porosity of greater than 60 percent.

9. The insulated container of claim 1, wherein the support member is positioned inboard of the inner cavity wall.

10. A method of forming an insulated container comprising:
    forming a metallic outer shell with a first opening at a top end of the outer shell, wherein the outer shell comprises an outer sidewall, an outer bottom wall, and a lower cavity on the outer bottom wall, wherein the lower cavity is spaced inward from the outer sidewall;
    forming a metallic inner shell with a second opening at a top end of the inner shell, wherein the inner shell has an inner sidewall and an inner bottom wall;
    placing a support member onto the outer bottom wall of the outer shell, wherein the support member comprises a ceramic material, wherein the support member is free of contact with the outer sidewall;
    placing the inner shell into the first opening of the outer shell, wherein the inner bottom wall of the inner shell contacts an upper surface of the support member;
    positioning an upper edge of the inner shell to align with an upper edge of the outer shell to compress the support member, wherein the support member is compressed to reduce a height of the support member at least 30 percent from a height of the support member in an uncompressed state;
    integrally joining the upper edge of the inner shell to the upper edge of the outer shell; and
    evacuating a mass of gas from a cavity between the outer shell and the inner shell to form a vacuum sealed cavity between the outer shell and the inner shell.

11. The method of claim 10, wherein the lower cavity comprises an inner cavity wall, an outer cavity wall, and a bottom cavity wall, wherein the inner cavity wall forms a continuous loop.

12. The method of claim 11, wherein the bottom cavity wall comprises three holes by which the mass of gas is evacuated.

13. The method of claim 11, wherein the support member is placed within the continuous loop formed by the inner cavity wall such that the support member is inboard of the inner cavity wall.

14. The method of claim 10, wherein the outer shell and the inner shell are formed from stainless steel.

15. The method of claim 10, wherein the support member has a thermal conductivity within a range of 0.013 W/(m*K) and 0.040 W/(m*K).

16. The method of claim 10, wherein the insulated container has a diameter at a top opening within a range of 230 mm and 260 mm, and a storage cavity has a height within a range of 180 mm and 220 mm.

17. An insulated container comprising:
- a metallic outer shell comprising an outer sidewall and an outer bottom wall, wherein the outer bottom wall has a lower ring-shaped cavity spaced inward from the outer sidewall, the lower ring-shaped cavity including an inner cavity wall, an outer cavity wall, and a bottom cavity wall;
- a metallic inner shell defining an inward facing surface comprising an inner sidewall and an inner bottom wall, wherein the inner bottom wall includes a planar central region;
- the outer shell being integrally joined to the inner shell forming an insulated double wall structure with a sealed vacuum cavity between the outer shell and the inner shell, wherein an upper edge of the outer shell is integrally joined to an upper edge of the inner shell;
- the insulated container having a top opening extending into a storage cavity, wherein the storage cavity has a volume within a range of 1800 cubic centimeters and 4000 cubic centimeters; and
- a support member located between the outer bottom wall and the inner bottom wall, wherein the support member is located adjacent to the inner cavity wall and contacts the inner shell and the outer shell, wherein the support member is free of contact with the outer sidewall, and wherein a height of the support member is compressed greater than 30 percent from an uncompressed state.

18. The insulated container of claim 17, further comprising a foot bracket connected to the lower ring-shaped cavity, wherein the foot bracket includes a pair of engaging members, and
- wherein an elastomeric foot member is connected to the foot bracket.

19. The insulated container of claim 17, wherein a width of the top opening is greater than a height of the storage cavity.

* * * * *